(12) United States Patent
Menendez et al.

(10) Patent No.: US 12,139,662 B2
(45) Date of Patent: Nov. 12, 2024

(54) SYNERGISTIC CORROSION INHIBITOR BLENDS

(71) Applicant: Baker Hughes Oilfield Operations LLC, Houston, TX (US)

(72) Inventors: Carlos M. Menendez, Houston, TX (US); Sunder Ramachandran, Sugar Land, TX (US); Tracey Jackson, Sugar Land, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 74 days.

(21) Appl. No.: 17/697,832

(22) Filed: Mar. 17, 2022

(65) Prior Publication Data
US 2023/0295486 A1    Sep. 21, 2023

(51) Int. Cl.
*C09K 8/54* (2006.01)
*C23F 11/14* (2006.01)

(52) U.S. Cl.
CPC .............. *C09K 8/54* (2013.01); *C23F 11/141* (2013.01); *C09K 2208/32* (2013.01)

(58) Field of Classification Search
None
See application file for complete search history.

(56) References Cited

U.S. PATENT DOCUMENTS

| | | | |
|---|---|---|---|
| 7,481,877 B2 | 1/2009 | Gichuhi et al. | |
| 7,507,399 B1 | 3/2009 | O'Lenick, Jr. | |
| 9,103,039 B2 | 8/2015 | Jenkins et al. | |
| 9,683,164 B2 | 6/2017 | Gunawan et al. | |
| 9,884,986 B2 | 2/2018 | Gunawan et al. | |
| 10,329,859 B2 | 6/2019 | Gupta et al. | |
| 10,550,482 B2 | 2/2020 | Hatchman et al. | |
| 2004/0164278 A1 | 8/2004 | Dahlmann et al. | |
| 2014/0200168 A1 | 7/2014 | Misra et al. | |

(Continued)

FOREIGN PATENT DOCUMENTS

| | | |
|---|---|---|
| EP | 2683849 A1 | 1/2014 |
| WO | 0066810 A1 | 11/2000 |

(Continued)

OTHER PUBLICATIONS

J. Aramaki et al., "Inhibition Mechanism of Medium-Sized Polymethyleneimine," Journal of Electrochemical Society: Electrochemical Science, May 1969, vol. 116, No. 5, pp. 568-574.

(Continued)

*Primary Examiner* — Jeffrey D Washville
(74) *Attorney, Agent, or Firm* — Crowe & Dunlevy, P.C.

(57) ABSTRACT

A method for inhibiting corrosion of metal surfaces, such as carbon steel tubing, that are in contact with a fluid, such as brine in an oil and gas production fluid containing acid gases (e.g., $CO_2$ and $H_2S$) is accomplished by introducing a corrosion-inhibiting blend of two components into the fluid, where blend is glycolipids and quaternized amines, glycolipids and phosphate-containing compounds, quaternized amines and imidazoline-like compounds, quaternized amines and phosphate-containing compounds, or combinations of these blends. Each of the two components of the blends are present in an amount effective to synergistically inhibiting the corrosion of the metal surface when used together.

6 Claims, 22 Drawing Sheets

SB / EQ-A Synergistic Plot for a Total Concentration of 5 ppm

(56) References Cited

U.S. PATENT DOCUMENTS

2016/0326424 A1* 11/2016 Hatchman ............... C09K 8/54
2020/0239338 A1   7/2020 Moloney et al.
2021/0301191 A1* 9/2021 Farmer ................. E21B 43/16
2022/0098468 A1* 3/2022 Delroisse ............... C09K 8/52

FOREIGN PATENT DOCUMENTS

| WO | 2011000895 A1 | 1/2011 |
| WO | 2012028542 A1 | 3/2012 |
| WO | 2012089649 A1 | 7/2012 |
| WO | 2013092440 A1 | 6/2013 |
| WO | 2013113740 A2 | 8/2013 |
| WO | 2020161408 A1 | 8/2020 |
| WO | 2021019470 A1 | 2/2021 |

OTHER PUBLICATIONS

Umoren, Saviour A., et al., "Synergistic corrosion inhibition effect of metal cations and mixtures of organic compounds: A Review", Journal of Environmental Chemical Engineering, vol. 5, No. 1, Dec. 5, 2016, pp. 246-269.

International Search and Written Opinion issued in PCT/US2023/015560 on Dec. 8, 2023.

* cited by examiner

SB / EQ-A Synergistic Plot for a Total Concentration of 5 ppm

EQ-A Corrosion Inhibition Efficiency Profile

SB Corrosion Inhibition Efficiency Profile

SB / EQ-B Synergistic Plot for a Total Concentration of 5 ppm

EQ-B Corrosion Inhibition Efficiency Profile

SB / PEQ-A Synergistic Plot for a Total Concentration of 5 ppm

PEQ-A Corrosion Inhibition Efficiency Profile

SB / PEQ-B Synergistic Plot for a Total Concentration of 5 ppm

PEQ-B Corrosion Inhibition Efficiency Profile

SB / EQI Imidazoline Synergistic Plot for a Total Concentration of 5 ppm

EQI Corrosion Inhibition Efficiency Profile

RB / EQ-A Synergistic Plot for a Total Concentration of 5 ppm

EQ-A Corrosion Inhibition Efficiency Profile

RB / EQ-B Synergistic Plot for a Total Concentration of 5 ppm

EQ-B Corrosion Inhibition Efficiency Profile

RB / PEQ-A Synergistic Plot for a Total Concentration of 5 ppm

PEQ-A Corrosion Inhibition Efficiency Profile

RB / PEQ-B Synergistic Plot for a Total Concentration of 5 ppm

PEQ-B Corrosion Inhibition Efficiency Profile

PE-A / EQ-B Synergistic Plot for a Total Concentration of 5 ppm

PE-A / EQ-B Synergistic Plot for a Total Concentration of 3 ppm

PE-A Corrosion Inhibition Efficiency Profile

EQ-B Corrosion Inhibition Efficiency Profile

PE-B / EQ-B Synergistic Plot for a Total Concentration of 5 ppm

PE-B Corrosion Inhibition Efficiency Profile

LGC / EQ-B Synergistic Plot for a Total Concentration of 10.5 ppm

LGC Corrosion Inhibition Efficiency Profile

LGHP / EQ-B Synergistic Plot for a Total Concentration of 50.5 ppm

LGHP Corrosion Inhibition Efficiency Profile

SB / LGC Synergistic Plot for a Total Concentration of 5 ppm

LGC Corrosion Inhibition Efficiency Profile

LGHP/SB Synergistic Plot for a Total Concentration of 50 ppm

LGHP Corrosion Inhibition Efficiency Profile

SB/PE-A Synergistic Plot for a Total Concentration of 5 ppm

PE-A Corrosion Inhibition Efficiency Profile

SB/PE-B Synergistic Plot for a Total Concentration of 5 ppm

PE-B Corrosion Inhibition Efficiency Profile

EQI / EQ-B Synergistic Plot for a Total Concentration of 50 ppm

EQI Corrosion Inhibition Efficiency Profile

EQ-B Corrosion Inhibition Efficiency Profile

EI / EQ-B Synergistic Plot for a Total Concentration of 5 ppm

EQ-B Corrosion Inhibition Efficiency Profile

EI / EQ-A Synergistic Plot for a Total Concentration of 5 ppm

EQ-A Corrosion Inhibition Efficiency Profile

SYNERGISTIC CORROSION INHIBITOR BLENDS

TECHNICAL FIELD

The present invention relates to methods and compositions for inhibiting the corrosion of metal surfaces that are in contact with fluids, and more particularly relates to methods and compositions for inhibiting the corrosion of metal surfaces that are in contact with oil and gas production fluids in equilibrium with such acid gases as $CO_2$ and $H_2S$ where the composition includes a synergistic blend of two components. The invention in principle should be applicable to inhibit the corrosion of metal surfaces in contact with a brine or composite fluid containing brine that is in equilibrium with acid gases such as carbon dioxide.

BACKGROUND

The exploitation of petroleum reserves includes the recovery, transport, and processing operations of the hydrocarbon fluid (oil and raw natural gas). During oil and gas production, the metal surfaces of tubing and in some instances, casing can come in contact with acid gases such as carbon dioxide ($CO_2$) and hydrogen sulfide ($H_2S$). These acid gases are in equilibrium with oil, natural gas and brine. These fluids cause corrosion of well tubing and casing especially if the material is made of low alloy carbon steel. Corrosion can lead to severe damage, affecting the life span of the tubing, and that can have an impact in operational safety and the environment.

Thus, it is desirable to develop new compositions and methods for inhibiting the corrosion of metal surfaces exposed to oil and gas production fluids containing acid gases. It is also desirable if the compositions and methods are relatively environmentally friendly.

SUMMARY

There is provided, in one form, a method for inhibiting corrosion of a metal surface in contact with an fluid containing a corrosive component selected from the group of acid gases consisting of carbon dioxide and hydrogen sulfide, where the method involves contacting the metal surface with the fluid comprising an effective amount to inhibit corrosion of a corrosion-inhibiting blend of two components, where the blend includes, but is not necessarily limited to, the following blends: glycolipids and quaternized amines, glycolipids and phosphate-containing compounds, quaternized amines and imidazoline-like compounds, quaternized amines and phosphate-containing compounds, and combinations of these blends. The method further includes that each of the two components of the blends are present in an amount effective to synergistically inhibit the corrosion of the metal surface with the blend having an improved performance greater than the sum of the inhibition the components achieved singly. In another non-limiting embodiment, the four types of blends noted above are blends of binary components as listed; i.e., they are "binary blends". Further the fluid is a mixture of brine with oil and/or natural gas in contact with a metal surface that is carbon steel and the oil or natural gas production fluid is equilibrium with the acid gases.

There is additionally provided, in another non-restrictive version, an oil or gas production fluid that contains a hydrocarbon selected from the group consisting of oil, natural gas, and combinations thereof, brine, at least one acid gas in equilibrium with the hydrocarbon and the brine where the acid gas is selected from the group consisting of carbon dioxide and hydrogen sulfide, and a synergistic corrosion-inhibiting binary blend selected from the group consisting of glycolipids and quaternized amines, glycolipids and phosphate-containing compounds, quaternized amines and imidazoline-like compounds, and/or quaternized amines and phosphate-containing compounds.

There is further provided, in a different non-restrictive form, synergistic corrosion-inhibiting blends that include, but are not necessarily limited to, the following binary blends: glycolipids and quaternized amines, glycolipids and phosphate-containing compounds, quaternized amines and imidazoline-like compounds, quaternized amines and phosphate-containing compounds, and combinations of these blends.

DETAILED DESCRIPTION

Figure 1:
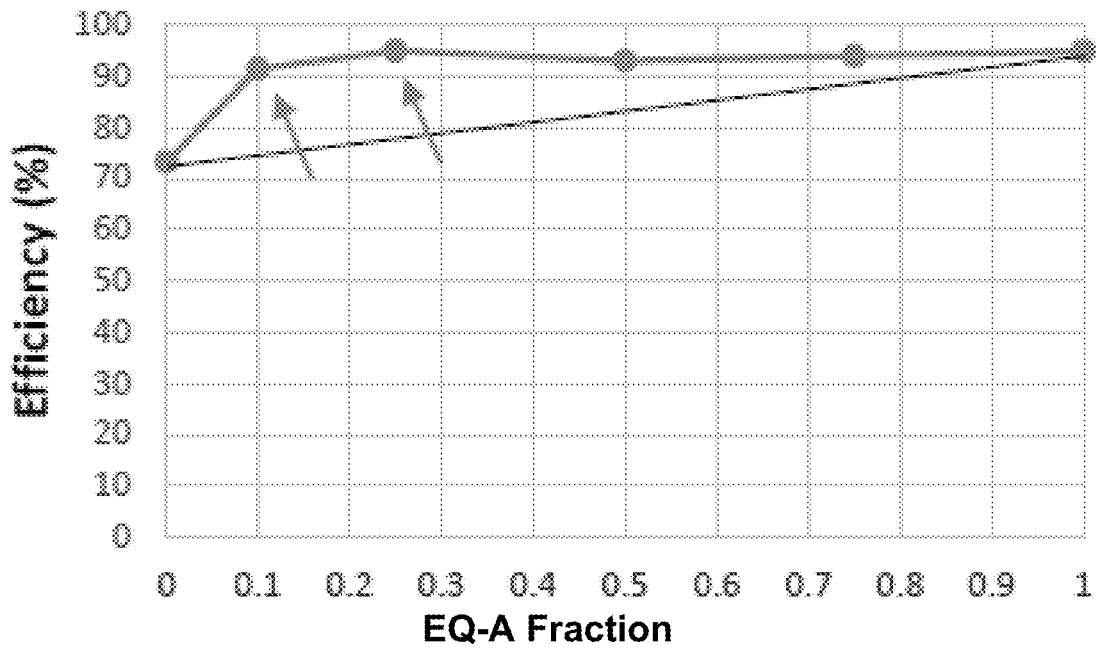
FIG. 1 is a graph of calculated inhibitor efficiency as a function of EQ-A fraction in a blend of SB and EQ-A for a total concentration of 5 ppm demonstrating synergy at the points with arrows.

Highly synergistic, environmentally friendly corrosion inhibitor binary blends have been discovered. By "environmentally friendly" is meant that the blends are expected to be readily biodegradable in sea water. These blends are important because they potentially provide a new generation of "green" corrosion inhibitor products for sensitive environmental regions such as Norway, the North Sea, Asia Pacific, Australia, Brazil, Ecuador, and West Africa.

In particular, the higher the synergy for a particular blend of corrosion inhibitors, the less amount or concentration of the blend is necessary for a particular application while still maintaining a high corrosion inhibition performance.

To discover promising corrosion inhibitor blends, synergy factors, $S_\theta$, were calculated using Equation 1 below which is taken from J. ARAMAKI et al., "Inhibition Mechanism of Medium-Sized Polymethyleneimine," *Journal of Electrochemical Society: Electrochemical Science*, May 1969, Vol. 116, No. 5, pp. 568-574:

$$S_\theta = \frac{(1 - \theta_{1+2})}{(1 - \theta'_{1+2})} \quad (1)$$

where:

$$\theta_{1+2} = (\theta_1 + \theta_2) - (\theta_1 \theta_2) \quad (2)$$

and $\theta_1$ and $\theta_2$ are the surface coverage for corrosion inhibitors 1 and 2 at their respective concentrations in separate tests under identical conditions. $\theta'_{1+2}$ is the surface coverage of the inhibitor blend.

Surface coverage was assumed to be equal to the inhibitor efficiency. $\theta_{1+2}$ in equation 1 represents the surface coverage of the blend after taking the interaction of components 1 and 2 ($\theta_1 * \theta_2$) from the addition of the surface coverages of the individual components ($\theta_1 + \theta_2$). In general, $S_\theta < 1$ implies an antagonistic behavior, whereas $S_\theta > 1$ implies synergistic effect. The larger the synergy factor is above 1 the stronger the synergy is between the components. Determining the synergy factor effectively allowed ranking the strength of the synergistic interactions across the tested binary blends. Details about the application of the determination of the synergy factors are given in the Examples.

Synergy is critical for enhanced corrosion inhibitor performance in the field. Field dosages often vary considerably from laboratory testing dosages because of the impact of inhibitor availability in field systems. Since many corrosion inhibitors are surfactants, they can be parasitically lost to a number of factors and processes. These factors include but are not limited to the presence of sand, the presence of emulsions, the presence of entrained scales, changes in brine chemistry that impact solubility, loss of pumping capabilities, plugged corrosion inhibitor injection lines, interference from other oil and gas production chemicals, etc. When corrosion inhibitor residual concentrations drop to low values, synergies such as those discussed herein are key to maintaining system integrity. The low concentration synergies explained herein will allow the system to maintain higher surface coverage even when the inhibitor levels drop to residual concentrations close to 5 ppm.

More specifically with respect to the components of the synergistic blends described herein, when the blend includes at least one glycolipid, suitable glycolipids include, but are not necessarily limited to, sophorolipids, rhamnolipids, and combinations thereof. In one non-limiting embodiment, suitable sophorolipids are those described in U.S. Pat. No. 9,683,164 B2 to Baker Hughes incorporated herein by reference in its entirety. In a more specific non-restrictive embodiment, a suitable sophorolipid is that shown in the acid form of structure (I) below in equilibrium with the lactonic form of structure (II).

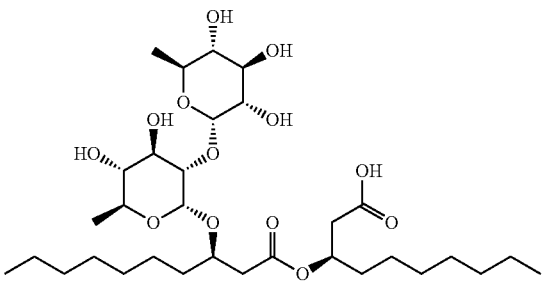

(III)

In another non-limiting embodiment, when the blend includes at least one quaternized amine, the quaternized amine has ester and alkoxy functional groups. Further,

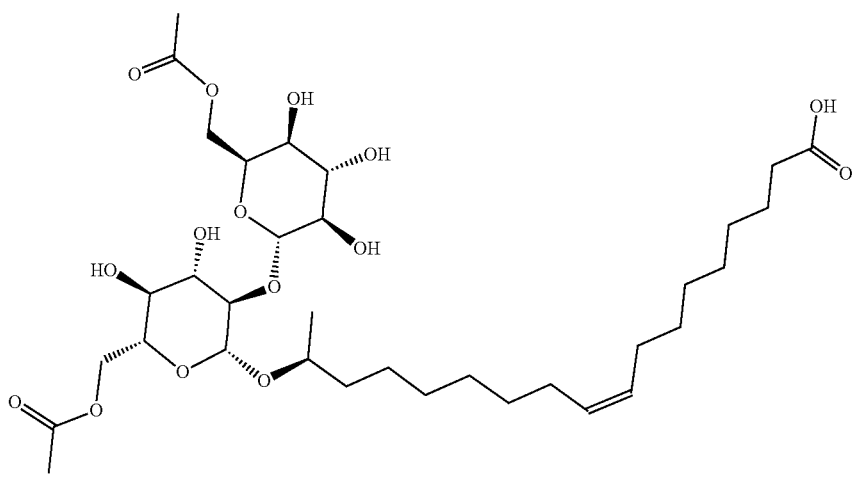

(I)

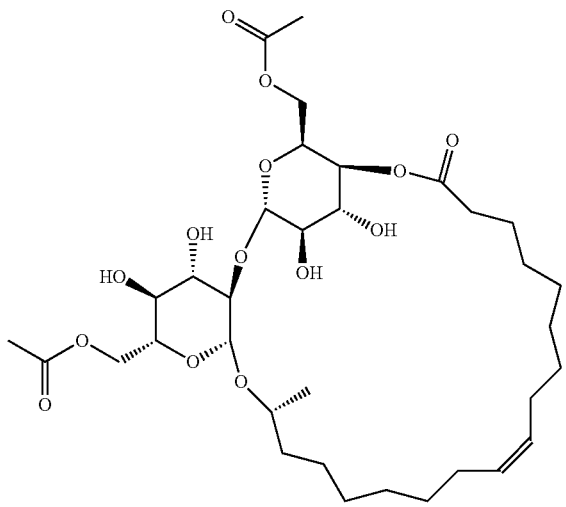

(II)

In a different non-limiting embodiment, suitable rhamnolipids are those described in U.S. Pat. No. 9,884,986 B2 to Baker Hughes incorporated herein by reference in its entirety. In a more specific non-restrictive embodiment, a suitable sophorolipid is that shown in the acid form of structure (III) below.

suitable quaternized amines include, but are not necessarily limited to, di(dimethyl(alkyl)ammonium chloride) ethanoyloxy-oxo, methyl quaternized N-methyl dialkanolamine and fatty acid diacid copolymers, esterified diquaternary amines, and combinations thereof. Suitable polyalkylene glycol diester diquats have the structure (IV):

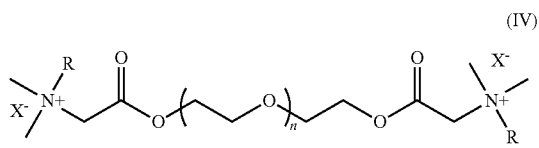
(IV)

and suitable polyalkylene glycol monoester quat have the structure (V):

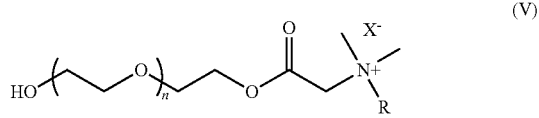
(V)

where X is Cl or Br; each R is independently a $C_{16}$-$C_{18}$ alkyl group; and n is within the range of 8 to 50.

In a different, non-restrictive version, when the blend includes at least one phosphate-containing compound, suitable phosphate-containing compounds include, but are not necessarily limited to, phosphate esters, ethoxylated phosphate esters, sodium hydroxypropylphosphate laurylglucoside crosspolymers, sodium laurylglucoside hydroxy propyl phosphates, sodium cocoglucosides hydroxypropyl phosphates, and combinations thereof. Suitable phosphate esters include, but are not necessarily limited to those of formula (VI), where m and n each independently range from 2 to 20 and $R_1$ is C6 to C18 and $R_2$ C6 to C18:

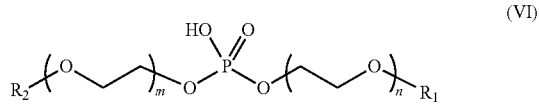
(VI)

In an alternate, non-limiting embodiment when the blend includes at least one imidazoline-like compound, suitable imidazoline-like compounds include, but are not necessarily limited to, ethoxylated quaternized imidazolines, ethoxylated imidazolines, naphthenic acid imidazolines, imidazolines that are reaction products of tall oil fatty acid and diethylenetriamine, and combinations thereof. Suitable ethoxylated quaternized imidazolines include, but are not necessarily limited to, those of formula (VII) where $R_1$ is a fatty acid residue, $R_2$ is an alkyl, aromatic, or combined alkyl-aromatic group, and n ranges from 3 to 25:

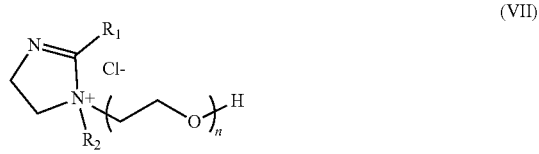
(VII)

Other suitable imidazolines include, but are not necessarily limited to, those of formula (VIII) and (IX):

(VIII)

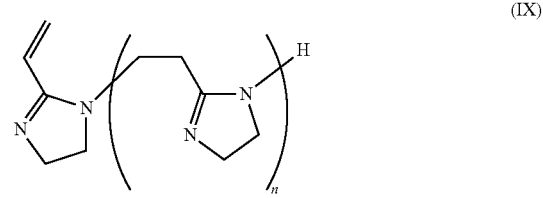
(IX)

In formula (VIII), R describes the hydrophobic tail portion of the molecule and J describes the pendant group of the molecule, R is the fatty or naphthenic acid residue. The Pendant group, J, may be selected from a group consisting of $(CH_2-CH_2)-X$, $(CH_2-CH_2-O)_nH$, $CH_2-CH_2-(NH-CH_2-CH_2)_y-Z$, where X can be $NH_2$, OH or NH—CO—R1, n can be 3 to 25 and where Z can be $NH_2$ or NH—CO—R2 and y is greater than 2. In formula (IX) n can be 1 to 5.

With respect to the proportions of the two components of the binary blends discovered to have synergistic effects when used in the fluid herein, this will depend on which component types are used together. Abbreviations for the classes of components are given below in Table I. Table II provides a broad range of proportions for each component and a narrow range of proportions for each component, for the binary blends given. It will be appreciated that the endpoints of the ranges in each row may be independently combined to give a suitable alternative range. For example, in the blend of SB/EQ-A, the SB component may be present from 2 to 500 ppm, and the EQ-A component may be used in a proportion from 0.1 to 20 ppm.

TABLE I

Component Names and Abbreviations

| Component Name | Abbrev. |
| --- | --- |
| Sophorolipid Biosurfactant | SB |
| Esterquat A | EQ-A |
| Esterquat B | EQ-B |
| Polyester quat A | PEQ-A |
| N-Methyl dialkanolamine and oleic fatty acid diacid copolymer, methyl quaternized | |
| Polyester quat B | PEQ-B |
| N-methyl dialkanolamine and fatty acid and polyol and diacid copolymer, methyl quaternized | |
| Ethoxylated Quaternized Imidazoline | EQI |
| Rhamnolipid Biosurfactant | RB |
| Ethoxylated phosphate ester | PE-A |
| Ethoxylated phosphate ester | PE-B |
| Sodium Hydroxypropylphosphate Laurylglucoside Crosspolymer | LGC |
| Sodium Laurylglucosides Hydroxypropyl Phosphate | LGHP |
| Sodium Cocoglucosides Hydroxypropyl Phosphate | CGHP |
| Ethoxylated Imidazoline | EI |
| Imidazoline/polyamine | IPA |
| 2:1 molar ratio of tall oil fatty acid/diethylenetriamine (TOFA/DETA) | T/D-A |
| 1:1 molar ratio TOFA/DETA with —OH head imidazoline | T/D-B |
| Naphthenic acid imidazoline | NAI |

TABLE II

Suitable Proportion Ranges for Binary Blends

| | | Broad Range (ppm) | | Narrow Range (ppm) | |
|---|---|---|---|---|---|
| Blend | Components | Low limit | High Limit | Low Limit | High Limit |
| SB/EQ-A | SB | 1 | 500 | 2 | 200 |
| | EQ-A | 0.1 | 50 | 0.2 | 20 |
| SB/EQ-B | SB | 1 | 500 | 2 | 200 |
| | EQ-B | 0.1 | 50 | 0.2 | 20 |
| SB/PEQ-A | SB | 1 | 500 | 2 | 200 |
| | PEQ-A | 0.1 | 50 | 0.2 | 20 |
| SB/PEQ-B | SB | 1 | 500 | 2 | 200 |
| | PEQ-B | 0.1 | 50 | 0.2 | 20 |
| SB/EQI | SB | 1 | 500 | 2 | 200 |
| | EQI | 0.1 | 50 | 0.2 | 20 |
| RB/EQ-A | RB | 1 | 500 | 2 | 200 |
| | EQ-A | 0.05 | 50 | 0.1 | 20 |
| RB/EQ-B | RB | 1 | 500 | 2 | 200 |
| | EQ-B | 0.1 | 50 | 0.2 | 20 |
| RB/PEQ-A | RB | 1 | 500 | 2 | 200 |
| | PEQ-A | 0.2 | 200 | 0.5 | 100 |
| RB/PEQ-B | RB | 1 | 500 | 2 | 200 |
| | PEQ-B | 0.05 | 50 | 0.1 | 20 |
| PE-A/EQ-B | PE-A | 1 | 500 | 2 | 200 |
| | EQ-B | 0.1 | 50 | 0.2 | 20 |
| PE-B/EQ-B | PE-B | 1 | 500 | 2 | 200 |
| | EQ-B | 0.1 | 50 | 0.2 | 20 |
| LGC/EQ-B | LGC | 1 | 500 | 2 | 200 |
| | EQ-B | 0.05 | 50 | 0.1 | 20 |
| LGHP/EQ-B | LGHP | 10 | 500 | 20 | 100 |
| | EQ-B | 0.05 | 10 | 0.1 | 5 |
| SB/LGC | SB | 1 | 500 | 2 | 200 |
| | LGC | 0.1 | 200 | 0.2 | 100 |
| LGHP/SB | LGHP | 5 | 500 | 10 | 200 |
| | SB | 0.1 | 50 | 0.2 | 20 |
| SB/PE-A | SB | 1 | 500 | 2 | 200 |
| | PE-A | 0.05 | 50 | 0.1 | 20 |
| SB/PE-B | SB | 1 | 500 | 2 | 200 |
| | PE-B | 0.05 | 50 | 0.1 | 20 |
| EQI/EQ-B | EQI | 1 | 500 | 2 | 200 |
| | EQ-B | 0.05 | 50 | 0.1 | 20 |
| EI/EQ-B | EI | 1 | 500 | 2 | 200 |
| | EQ-B | 0.05 | 50 | 0.1 | 20 |
| EI/EQ-A | EI | 1 | 500 | 2 | 200 |
| | EQ-A | 0.05 | 50 | 0.1 | 20 |

In another non-restrictive version, the blend has a weight ratio of components ranging from about 20:1 independently to about 1:20; alternatively from about 19:1 independently to about 1:19; in a different non-limiting embodiment from about 10:1 independently to about 1:10; in another non-restrictive version from about 9:1 independently to about 1:9; alternatively from about 5:1 independently to about 1:5; in another non-limiting embodiment from about 3:1 independently to about 1:3; and finally at a ratio of about 1:1, which about 1:1 ratio may be a suitable endpoint for any of the previous proportion ranges. Where the word "independently" is used with respect to a range, it will be understood that any of the endpoints mentioned may be used together with any other of the endpoints to give a suitable alternative range.

The effective amount of the corrosion-inhibiting blend in the aqueous fluid ranges from about 1 ppm independently to about 500 ppm; alternatively, from about 2 ppm independently to about 200 ppm. The corrosive fluid may be any oilfield fluid in contact with a metal surface. Suitable specific fluids include, but are not necessarily limited to, oil and natural gas production fluids that are in contact with metal tubulars in general, and in a non-restrictive specific case, carbon steel tubing and casing. To further define the fluids in a non-limiting embodiment, the fluid is oil and/or natural gas containing brine where acid gases such as $CO_2$ and $H_2S$ are in equilibrium therewith.

In one non-limiting embodiment of the method and compositions herein, the blend has a corrosion efficiency of at least 85% (or 0.85 fractional surface coverage); alternatively, at least 90% (or 0.90 fractionally surface coverage); in a different non-restrictive version at least 95% (or 0.95 fractionally surface coverage); and in an alternate non-limiting embodiment at least 97% (or 0.97 fractionally surface coverage), where inhibition efficiency is defined as blank corrosion rate minus inhibited corrosion rate with the result divided by the blank corrosion rate. This fraction is multiplied by 100 to get the percent inhibition or corrosion efficiency. Corrosion efficiency in both fractional and percent inhibition forms will be used interchangeably to describe corrosion inhibitor blend performance.

The invention will now be described with respect to particular embodiments which are not intended to limit the invention in any way, but which are simply to further highlight or illustrate the invention. All percentages (%) given below are weight percentages unless otherwise noted and all ratios are weight ratios unless otherwise noted.

EXAMPLES

Glycolipids and Quaternized Amines

SB+EQ-A–5 ppm Blends

Figure 2:
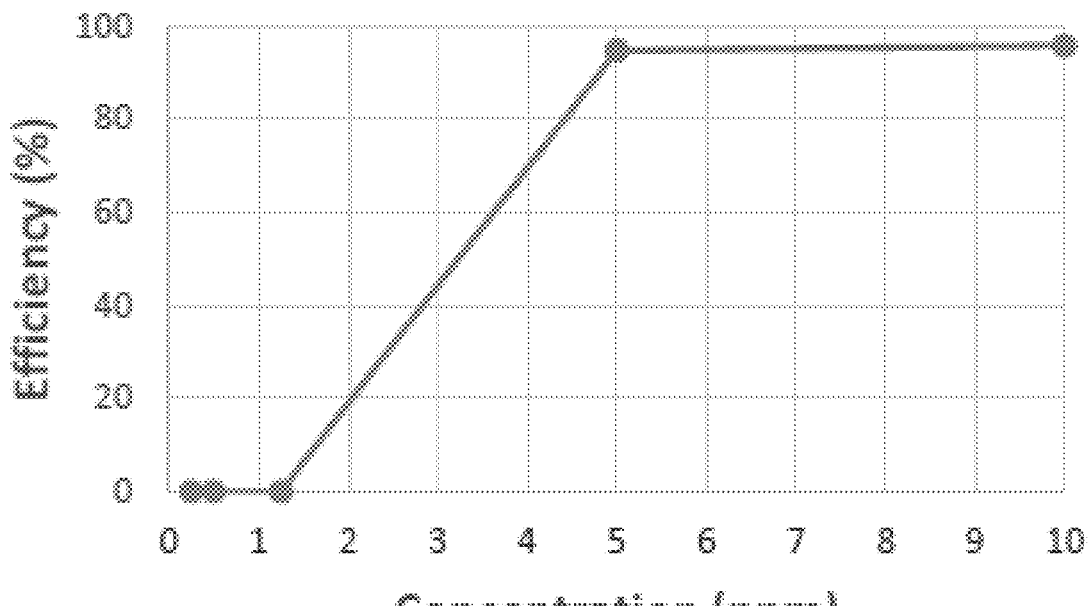
FIG. 2 is a graph of calculated inhibitor efficiency as a function of EQ-A concentration for the FIG. 1 blend.
Figure 3:
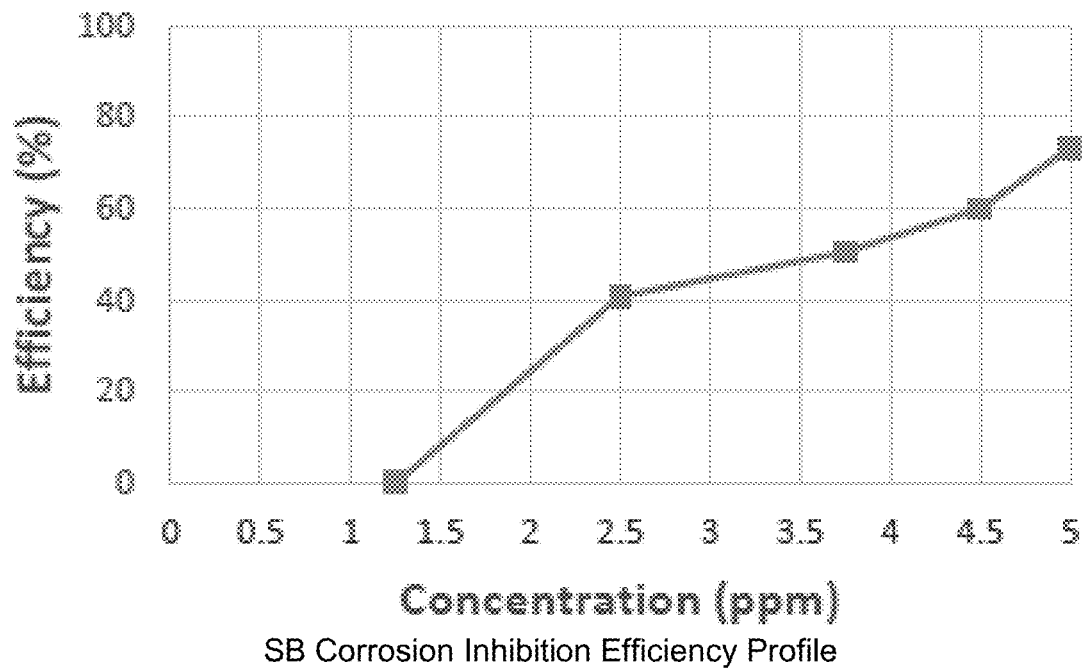
FIG. 3 is a graph of calculated inhibitor efficiency as a function of SB concentration for the FIG. 1 blend.

Table III shows the synergy factors calculated for blends of SB with EQ-A at ratios of 3:1 and 9:1, respectively. FIG. 1 shows the mixture data points in a plot of inhibitor efficiency versus the fraction of EQ-A in the blend. The efficiency data points for pure EQ-A at 2.5 and 3.75 ppm are not available and therefore the synergy factors were not calculated. The synergy factors of 9.7 and 4.7 calculated for the 3:1 and 9:1 mole ratios, respectively, suggest a quite strong synergy between SB and EQ-A. It can be noticed from FIG. 2 that EQ-A did not exhibit corrosion inhibition performance at 1.25 ppm and under. FIG. 3 shows the corrosion inhibition efficiency profile for SB. It should be noted that just the availability of EQ-A at these concentrations promoted a significant synergy by increasing the efficiency of SB from 50.5 and 60.0% to 94.9 and 91.4%, respectively.

An example is provided below on the use of the J. Aramaki et. al. equation for calculating the synergy factors. In this case one of the two components did not exhibit surface coverage when tested as a single chemistry. From Table III the calculation of the synergy factor for the data point at 0.25 weight fraction of EQ-A is as follows:

$$S_\theta = \frac{(1 - ((\theta_1 + \theta_2) - \theta_1 * \theta_2)}{(1 - \theta'_{1+2})}$$

$$S_\theta = \frac{(1 - ((0.505 + 0) - (0.505 * 0))}{(1 - 0.949)} = 9.7$$

where:

$\theta_1$=0.505 and is the surface coverage for SB at 3.75 ppm $\theta_2$=0 and is the surface coverage of EQ-A at 1.25 ppm $\theta_1 * \theta_2$=(0.505*0)=0

$\theta'_{1+2}$=0.949 is the surface coverage of the blend at 5 ppm.

TABLE III

Surface Coverages and Synergy Factors for SB and EQ-A Blends

| Wt. Fraction of EQ-A | SB (ppm) | EQ-A (ppm) | Wt. Ratio | θ | $S_\theta$ | FIG. |
|---|---|---|---|---|---|---|
|  | 5 | 0 |  | 0.732 |  | FIG. 3 |
|  | 0 | 5 |  | 0.948 |  | FIG. 2 |
| 0.1 | 4.5 | 0.5 | 9:1 | 0.914 | 4.7 | FIG. 1 |
|  | 4.5 | 0 |  | 0.60 |  | FIG. 3 |
|  | 0 | 0.5 |  | 0 |  | FIG. 2 |
| 0.25 | 3.75 | 1.25 | 3:1 | 0.949 | 9.7 | FIG. 1 |
|  | 3.75 | 0 |  | 0.505 |  | FIG. 3 |
|  | 0 | 1.25 |  | 0 |  | FIG. 2 |
| 0.5 | 2.5 | 2.5 | 1:1 | 0.929 | N.A* | FIG. 1 |
| 0.75 | 1.25 | 3.75 | 1:3 | 0.939 | N.A** | FIG. 1 |

*2.5 ppm data point not available for EQ-A.
**3.75 ppm data point not available for EQ-A.

SB+EQ-B–5 ppm Blends

Figure 4:
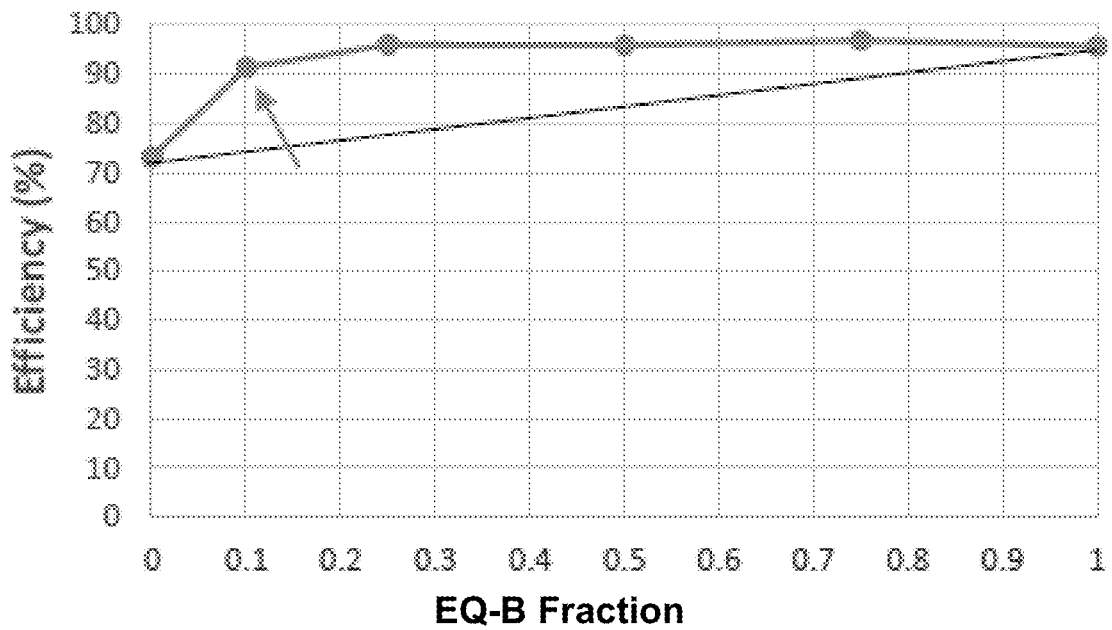
FIG. 4 is a graph of calculated inhibitor efficiency as a function of EQ-B fraction in a blend of SB and EQ-B for a total concentration of 5 ppm demonstrating synergy at the point with an arrow.
Figure 5:
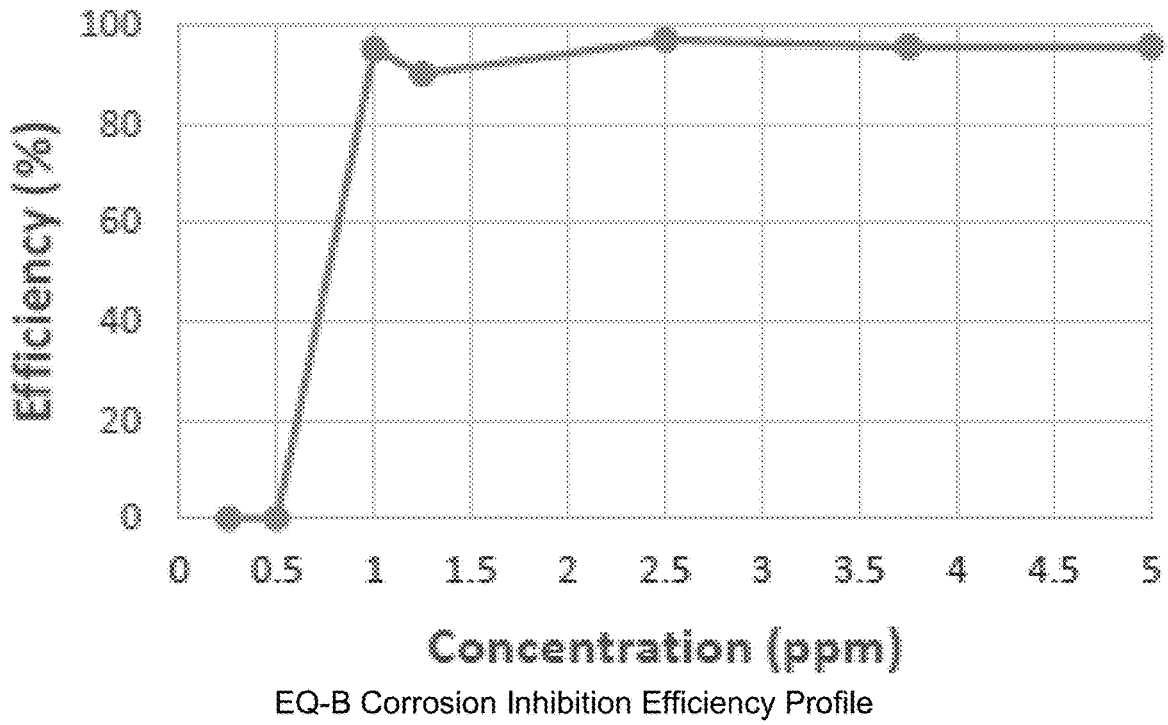
FIG. 5 is a graph of calculated inhibitor efficiency as a function of EQ-B concentration for the FIG. 4 blend.

Table IV shows the synergy factors calculated for SB and EQ-B with ratios of 9:1, 3:1, 1:1, and 1:3, respectively. FIG. 4 shows the mixture data points in a graph of efficiency versus the fraction of EQ-B in the mixture. In this case, the strongest synergy was observed for the 9:1 ratio that exhibited a synergy factor of 4.7. It can be seen from FIG. 5 that EQ-B exhibited high corrosion inhibition efficiencies above 90% above 1.25 ppm. No inhibition efficiency was observed under 1.25 ppm. The fact that the synergy factors for the 3:1, 1:1, and 1:3 ratios were 1.2, 0.43, and 1.4, respectively, suggests that EQ-B and SB are not antagonistic at these ratios but EQ-B performance is dominant. FIG. 3 shows the corrosion inhibition efficiency profile for SB. FIG. 5 shows the efficiency profile for EQ-B. As in the case of EQ-A, the availability of EQ-B at 0.5 ppm (no individual performance at this concentration) promoted a significant synergy by increasing the efficiency of SB from 60.0% to 91.4%.

Another example is provided below on the use of the Aramaki et. al. equation for calculating the synergy factors. In this case both components exhibited surface coverage when tested individually. From Table IV, calculation of the synergy factor for the data point at 0.25 weight fraction of EQ-B is as follows:

$$S_\theta = \frac{(1 - ((\theta_1 + \theta_2) - \theta_1 * \theta_2)}{(1 - \theta'_{1+2})}$$

$$S_\theta = \frac{(1 - ((0.505 + 0.901) - (0.505 * 0.901))}{(1 - 0.96)} = 1.2$$

where:
$\theta_1$=0.505 and is the surface coverage for SB at 3.75 ppm
$\theta_2$=0.901 and is the surface coverage of EQ-B at 1.25 ppm
$\theta_1 * \theta_2$=(0.505*0.901)=0.455
$\theta'_{1+2}$=0.96

TABLE IV

Surface Coverages and Synergy Factors for SB and EQ-B Blends

| Wt. Fraction of EQ-B | SB (ppm) | EQ-B (ppm) | Wt. Ratio | θ | $S_\theta$ | FIG. |
|---|---|---|---|---|---|---|
|  | 5 | 0 |  | 0.732 |  | FIG. 3 |
|  | 0 | 5 |  | 0.957 |  | FIG. 5 |
| 0.1 | 4.5 | 0.5 | 9:1 | 0.914 | 4.7 | FIG. 4 |
|  | 4.5 | 0 |  | 0.60 |  | FIG. 3 |
|  | 0 | 0.5 |  | 0 |  | FIG. 5 |
| 0.25 | 3.75 | 1.25 | 3:1 | 0.96 | 1.2 | FIG. 4 |
|  | 3.75 | 0 |  | 0.505 |  | FIG. 3 |
|  | 0 | 1.25 |  | 0.901 |  | FIG. 5 |
| 0.5 | 2.5 | 2.5 | 1:1 | 0.959 | 0.43 | FIG. 4 |
|  | 2.5 | 0 |  | 0.408 |  | FIG. 3 |
|  | 0 | 2.5 |  | 0.97 |  | FIG. 5 |
| 0.75 | 1.25 | 3.75 | 1:3 | 0.969 | 1.4 | FIG. 4 |
|  | 1.25 | 0 |  | 0 |  | FIG. 3 |
|  | 0 | 3.75 |  | 0.957 |  | FIG. 5 |

SB+PEQ-A–5 ppm Blends

Figure 6:
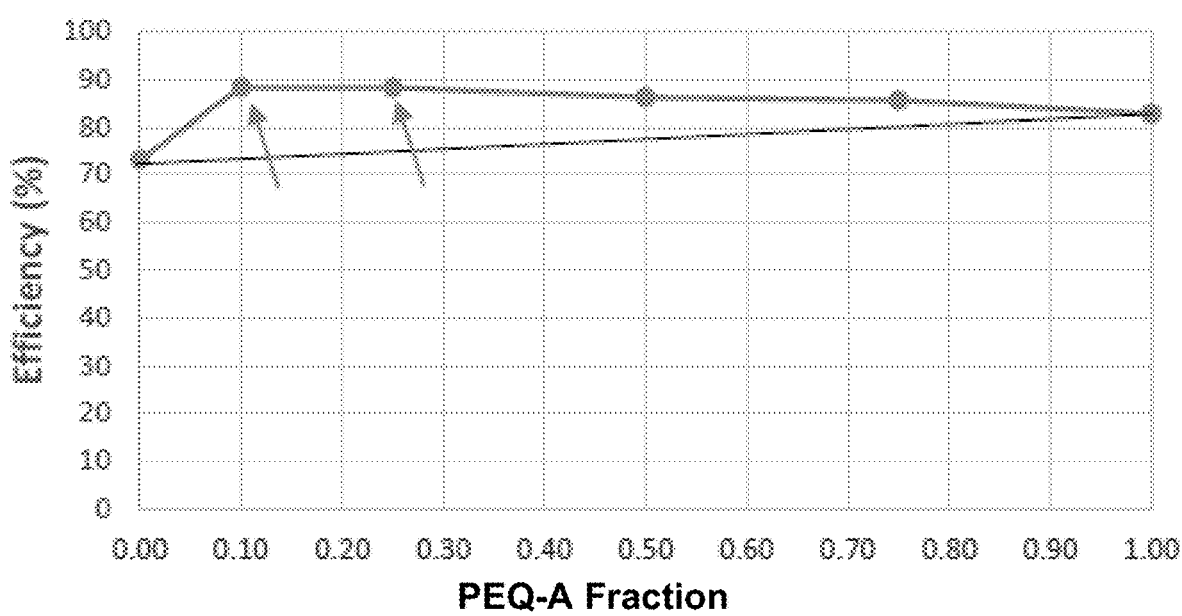
FIG. 6 is a graph of calculated inhibitor efficiency as a function of PEQ-A fraction in a blend of SB and PEQ-A for a total concentration of 5 ppm demonstrating synergy at the points with arrows.
Figure 7:
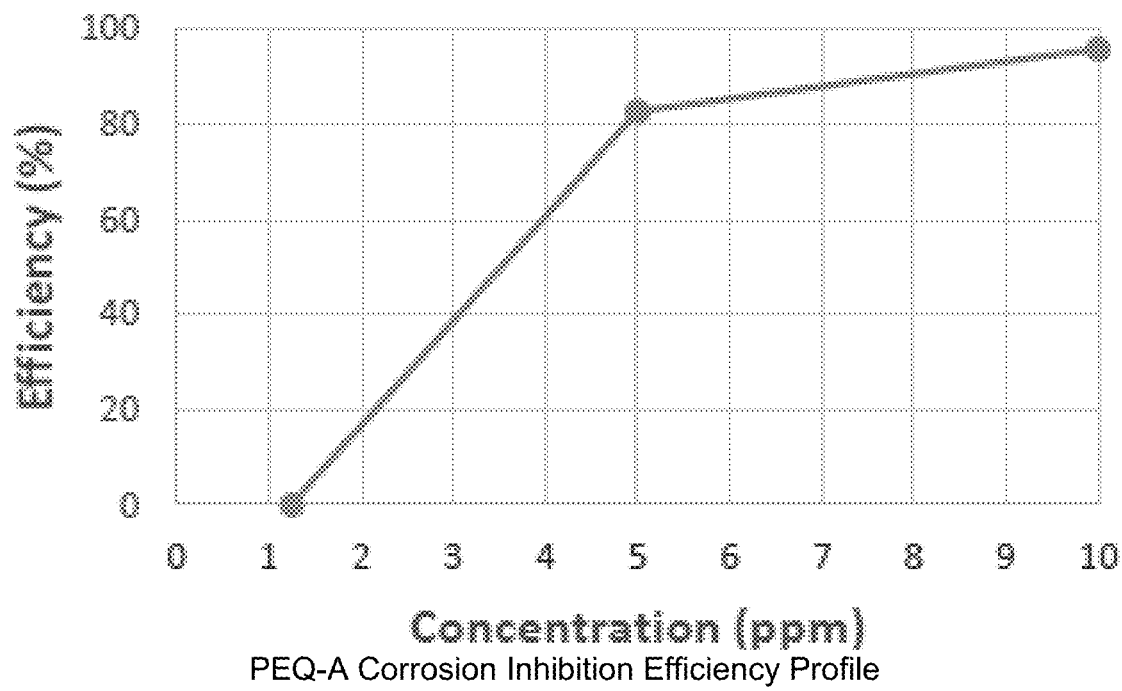
FIG. 7 is a graph of calculated inhibitor efficiency as a function of PEQ-A concentration for the FIG. 6 blend.

Table V shows the synergy factors calculated for the SB and PEQ-A with ratios of 9:1 and 3:1, respectively. FIG. 6 shows the mixture data points using a plot of the mixture corrosion inhibition efficiency versus the fraction of PEQ-A in the mixture. In this case, both the 9:1 and the 3:1 ratios exhibited significant synergy factors of 3.4 and 4.2, respectively. It can be noticed from FIG. 7 that PEQ-A exhibited high corrosion inhibition efficiencies above 80% from 5 to 10 ppm. No inhibition efficiency was observed at 1.25 ppm PEQ-A. FIG. 3 shows the corrosion inhibition efficiency profile for SB. FIG. 7 shows the efficiency profile for PEQ-A. As in the previous cases, the availability of PEQ-A at 0.5 and 1.25 ppm promoted a significant synergy by increasing the efficiency of SB from 60 and 50.5% to 88.3 and 88.2%, respectively.

TABLE V

Surface Coverages and Synergy Factors for SB and PEQ-A Blends

| Wt. Fraction of PEQ-A | SB (ppm) | PEQ-A (ppm) | Wt. Ratio | θ | $S_\theta$ | FIG. |
|---|---|---|---|---|---|---|
|  | 5 | 0 |  | 0.732 |  | FIG. 3 |
|  | 0 | 5 |  | 0.828 |  | FIG. 7 |
| 0.1 | 4.5 | 0.5 | 9:1 | 0.883 | 3.4 | FIG. 6 |
|  | 4.5 | 0 |  | 0.60 |  | FIG. 3 |
|  | 0 | 0.5 |  | 0 |  | FIG. 7 |
| 0.25 | 3.75 | 1.25 | 3:1 | 0.882 | 4.2 | FIG. 6 |
|  | 3.75 | 0 |  | 0.505 |  | FIG. 3 |
|  | 0 | 1.25 |  | 0 |  | FIG. 7 |

SB+PEQ-B–5 ppm Blends

Figure 8:
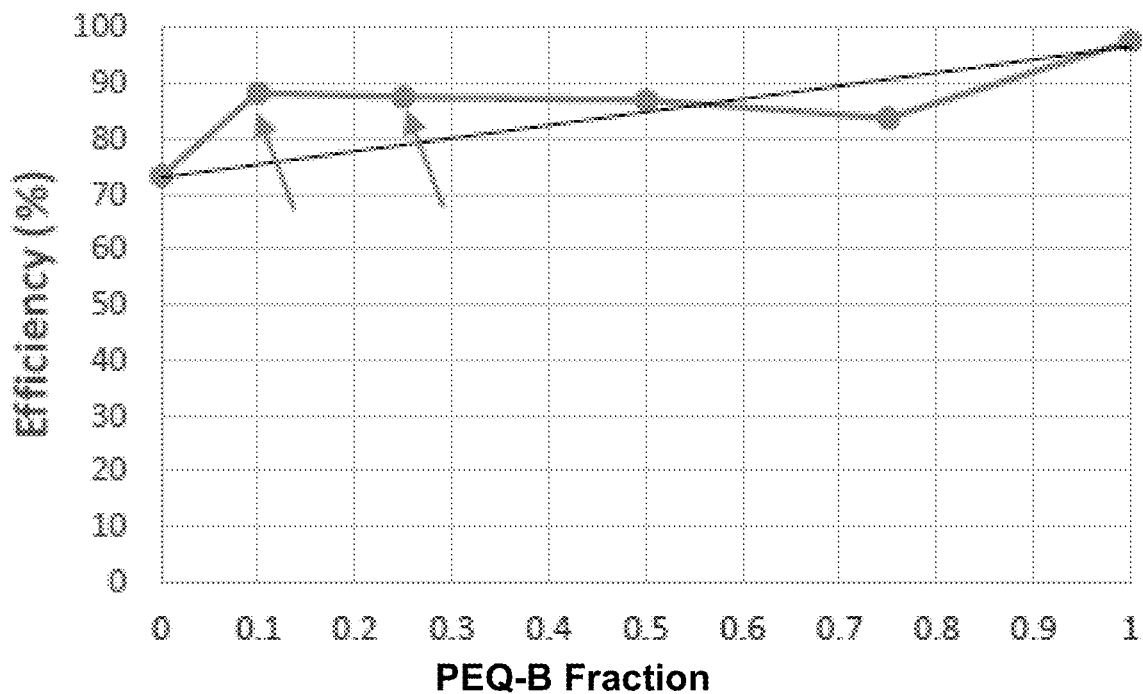
FIG. 8 is a graph of calculated inhibitor efficiency as a function of PEQ-B fraction in a blend of SB and PEQ-B for a total concentration of 5 ppm demonstrating synergy at the points with arrows.
Figure 9:
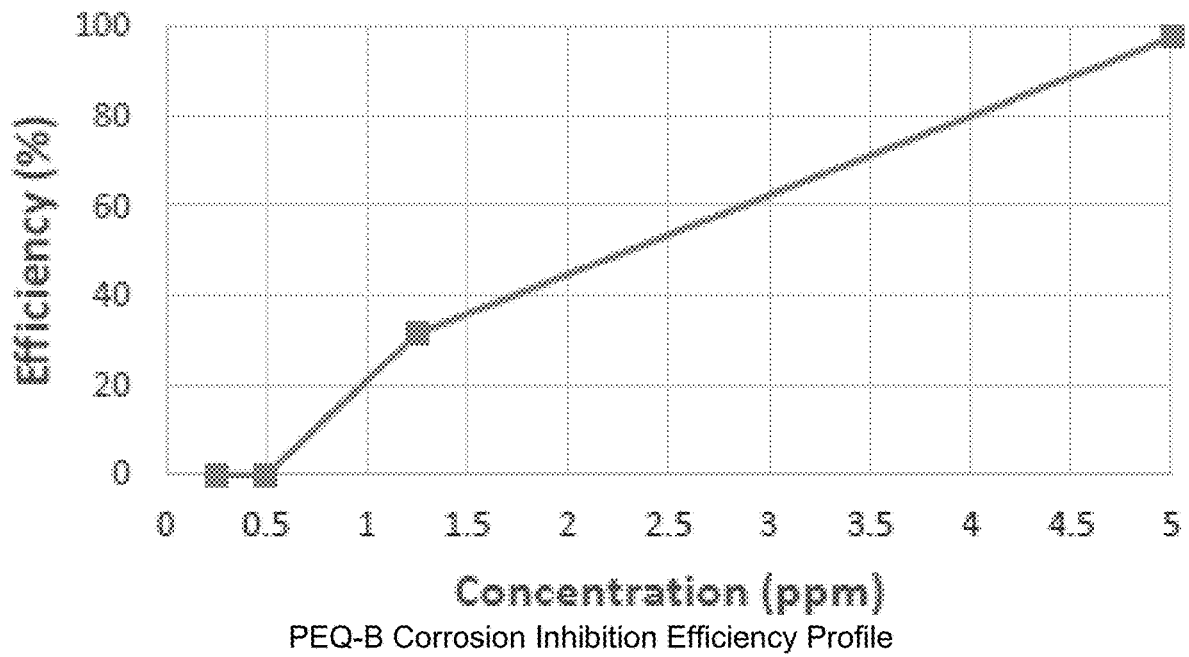
FIG. 9 is a graph of calculated inhibitor efficiency as a function of PEQ-B concentration for the FIG. 8 blend.

Table VI shows the synergy factors calculated for the SB and PEQ-B mixtures ratios of 9:1 and 3:1, respectively. FIG. 8 shows the mixture data points using a plot of the mixture corrosion inhibition efficiency versus the fraction of PEQ-B in the mixture. In this case, both the 9:1 and the 3:1 ratios exhibited significant synergy factors of 3.4 and 2.7, respectively. FIG. 9 shows the efficiency profile for PEQ-B. It is seen from FIG. 9 that PEQ-B exhibited high corrosion inhibition efficiencies >97% at 5 ppm. No inhibition efficiency was observed for PEQ-B at 0.25 and 0.5 ppm. Similarly, only a 31.5% efficiency was observed at 1.25 ppm PEQ-B. FIG. 3 shows the corrosion inhibition efficiency profile for SB. The availability of PEQ-B at 0.5 ppm promoted a significant synergy by increasing the efficiency of SB from 60 to 88.2%. For the 3:1 ratio there was a significant increase in efficiency also, but for this mixture both SB and PEQ-B exhibited some individual performance when dosed singly at the concentrations of 3.75 and 1.25 ppm, respectively.

TABLE VI

Surface Coverages and Synergy Factors for SB and PEQ-B Blends

| Wt. Fraction of PEQ-B | SB (ppm) | PEQ-B (ppm) | Wt. Ratio | θ | $S_\theta$ | FIG. |
|---|---|---|---|---|---|---|
| | 5 | 0 | | 0.732 | | FIG. 3 |
| | 0 | 5 | | 0.9758 | | FIG. 9 |
| 0.1 | 4.5 | 0.5 | 9:1 | 0.882 | 3.4 | FIG. 8 |
| | 4.5 | 0 | | 0.60 | | FIG. 3 |
| | 0 | 0.5 | | 0 | | FIG. 9 |
| 0.25 | 3.75 | 1.25 | 3:1 | 0.875 | 2.7 | FIG. 8 |
| | 3.75 | 0 | | 0.505 | | FIG. 3 |
| | 0 | 1.25 | | 0.315 | | FIG. 9 |

SB+EQI–5 ppm

Figure 10:
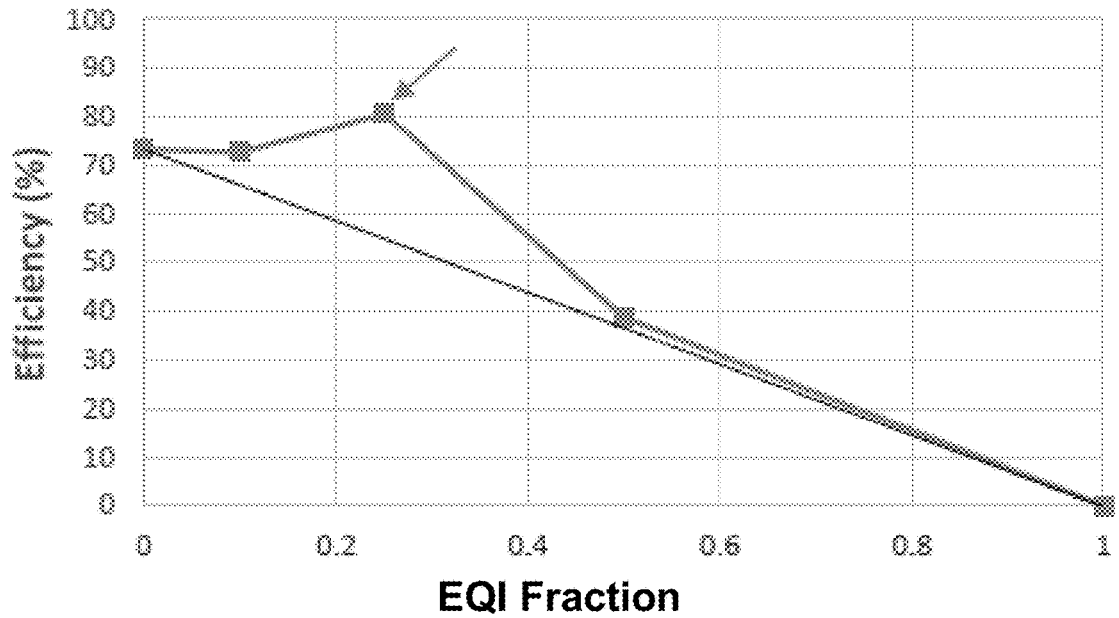
FIG. 10 is a graph of calculated inhibitor efficiency as a function of EQI fraction in a blend of SB and EQI for a total concentration of 5 ppm demonstrating synergy at the point with an arrow.
Figure 11:
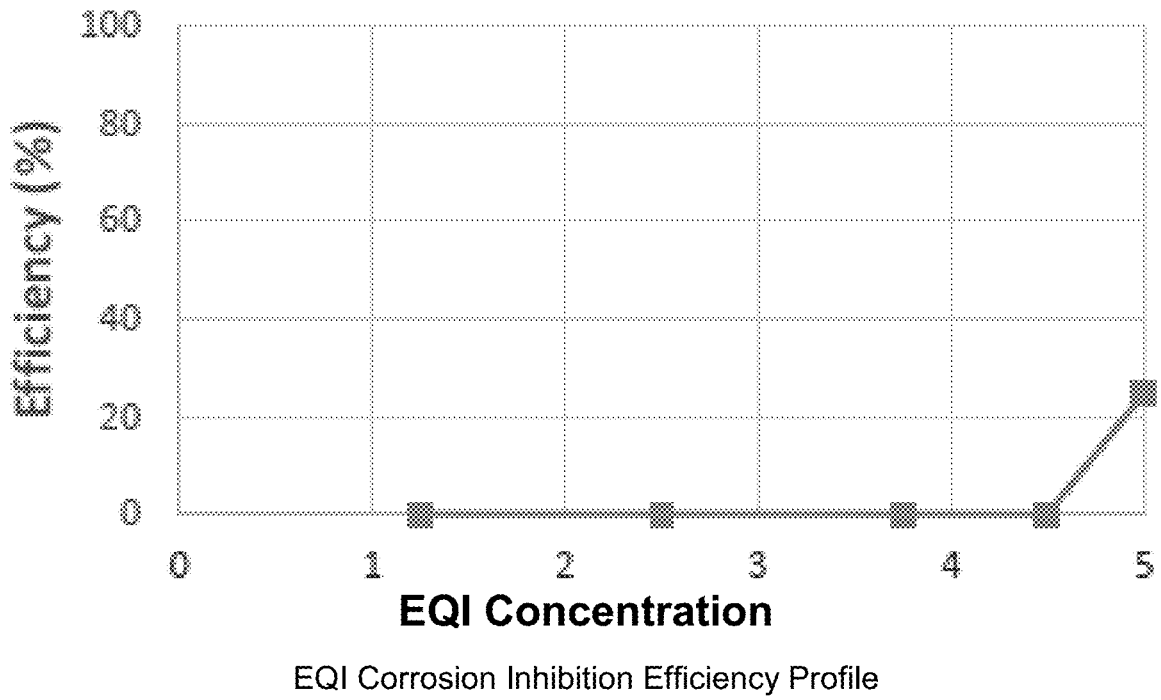
FIG. 11 is a graph of calculated inhibitor efficiency as a function of EQI concentration for the FIG. 10 blend.

Table VII shows the synergy factors calculated for the SB and EQI blends with ratios of 9:1, 3:1, and 1:1. FIG. 10 shows the mixture data points using a plot of the mixture corrosion inhibition efficiency versus the fraction of EQI in the mixture. In this case, the largest synergy factor of 2.6 was obtained for the 3:1 ratio which suggests a synergistic interaction. For this ratio, the synergistic interaction emerged from small amounts of EQI being present with small amounts of SB, since EQI did not exhibit corrosion inhibition performance by itself at 1.25 ppm. The other calculated synergy factors were lower but do not indicate significant antagonistic interference since both factors or close to or slightly larger than 1. FIG. 3 shows the corrosion inhibition efficiency profile for SB while FIG. 11 shows the corrosion inhibition profile for EQI. EQI did not exhibit corrosion inhibition performance at concentrations below 4.5 ppm.

TABLE VII

Surface Coverages and Synergy Factors for SB and EQI Blends

| Wt. Fraction of EQI | SB (ppm) | EQI (ppm) | Wt. Ratio | θ | $S_\theta$ | FIG. |
|---|---|---|---|---|---|---|
| | 5 | 0 | | 0.732 | | FIG. 3 |
| | 0 | 5 | | 0.248 | | FIG. 11 |
| 0.1 | 4.5 | 0.5 | 9:1 | 0.726 | 1.5 | FIG. 10 |
| | 4.5 | 0 | | 0.60 | | FIG. 3 |
| | 0 | 0.5 | | 0 | | FIG. 11 |
| 0.25 | 3.75 | 1.25 | 3:1 | 0.806 | 2.6 | FIG. 10 |
| | 3.75 | 0 | | 0.505 | | FIG. 3 |
| | 0 | 1.25 | | 0 | | FIG. 11 |
| 0.5 | 2.5 | 2.5 | 1:1 | 0.388 | 0.97 | FIG. 10 |
| | 2.5 | 0 | | 0.408 | | FIG. 3 |
| | 0 | 2.5 | | 0 | | FIG. 11 |

Note: There are no data for RB together with EQI, but one of ordinary skill in the art would expect synergies based on the SB results above.

RB+EQ-A–5 ppm Blends

Figure 12:
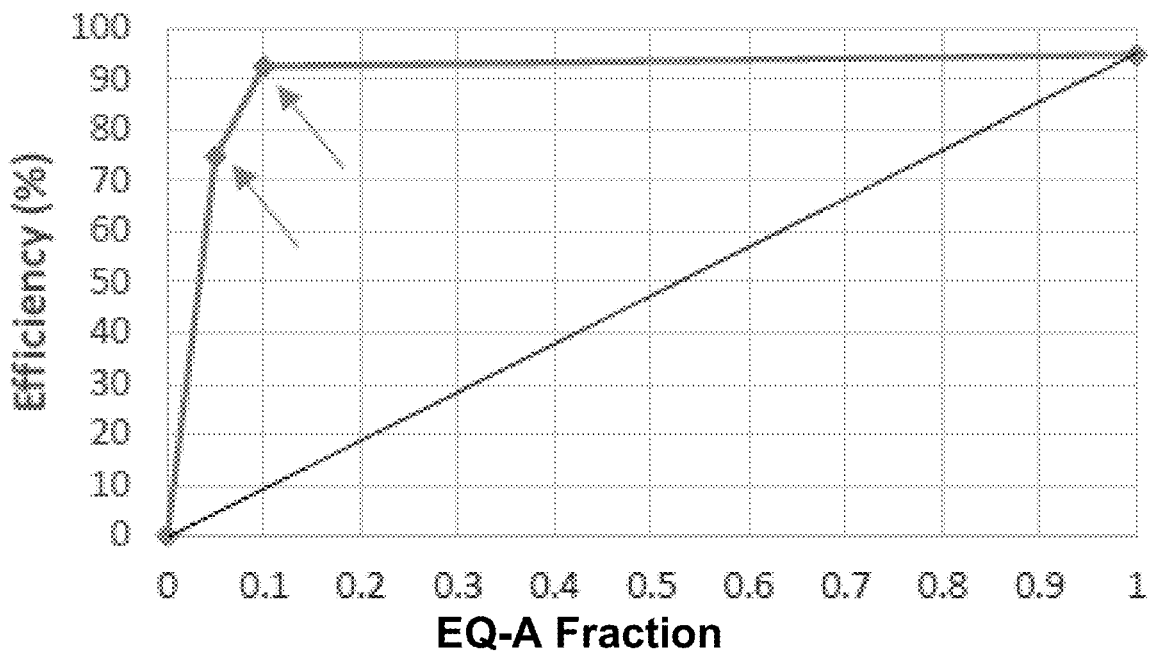
FIG. 12 is a graph of calculated inhibitor efficiency as a function of EQ-A fraction in a blend of RB and EQ-A for a total concentration of 5 ppm demonstrating synergy at the points with arrows.
Figure 13:
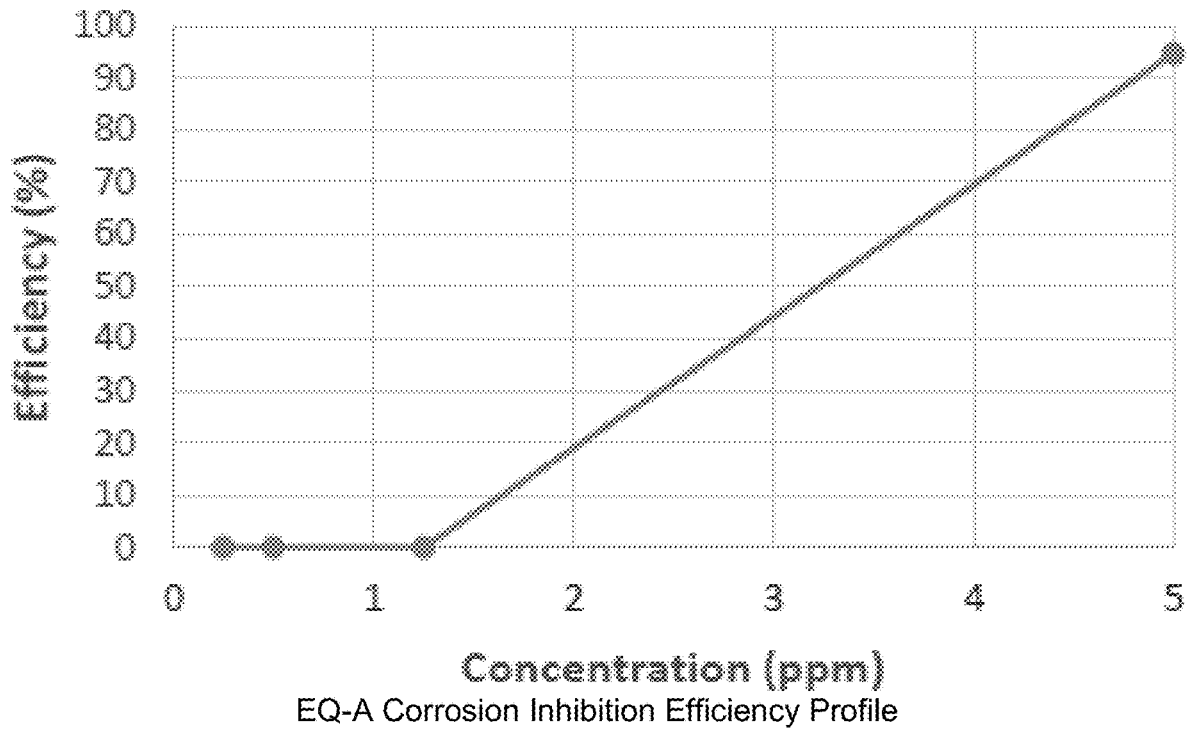
FIG. 13 is a graph of calculated inhibitor efficiency as a function of EQ-A concentration for the FIG. 12 blend.

Table VIII shows the synergy factors calculated for the RB and EQ-A blend with the ratio of 19:1 and 9:1. FIG. 12 shows the mixture data points using a plot of the mixture corrosion inhibition efficiency versus the fraction of EQ-A in the mixture. In this case, the synergy factors obtained for the 19:1 and 9:1 ratios were 4.0 and 13.3, respectively, which suggest very strong synergistic interactions. Neither RB nor EQ-A exhibited performance at the concentrations used in the blends which makes their case for synergistic interaction much stronger. There is the possibility that the 3:1 ratio will be synergistic as well but the data point is not available in this disclosure. To establish the performance for the 1:1 and 1:3 ratios the efficiencies of EQ-A at 2.5 and 3.75 ppm need to be measured. FIG. 13 shows the individual corrosion inhibition profile for EQ-A. RB did not exhibit corrosion inhibition at any concentration up to and including 5 ppm; therefore, no plot is needed to visualize its performance.

Another example is provided below on the use of the Aramaki et. al. equation for calculating the synergy factors. In this case neither component exhibited surface coverage when tested individually. From Table VIII the calculation of the synergy factor for the 0.1 weight fraction of EQ-A will be as follows:

$$S_\theta = \frac{(1 - ((\theta_1 + \theta_2) - \theta_1 * \theta_2))}{(1 - \theta'_{1+2})}$$

$$S_\theta = \frac{(1 - ((0 + 0) - (0 * 0)))}{(1 - 0.925)} = 13.3$$

where:
$\theta_1 = 0$ and is the surface coverage for RB at 4.5 ppm
$\theta_2 = 0$ and is the surface coverage of EQ-A at 0.5 ppm
$\theta_1 * \theta_2 = (0*0) = 0$
$\theta_{1+2} = 0.925$ where $\theta'_{1+2}$ is the surface coverage of the inhibitor blend.

It will be appreciated that the other reported synergy factors were similarly calculated even though the calculations will not be explicitly shown herein for each case.

TABLE VIII

Surface Coverages and Synergy Factors for RB and EQ-A at 5 ppm

| Wt. Fraction of EQ-A | RB (ppm) | EQ-A (ppm) | Wt. Ratio | θ | $S_\theta$ | FIG. |
|---|---|---|---|---|---|---|
| | 5 | 0 | | 0 | | n/a* |
| | 0 | 5 | | 94.8 | | FIG. 13 |
| 0.05 | 4.75 | 0.25 | 19:1 | 74.7 | 4.0 | FIG. 12 |
| | 4.75 | 0 | | 0 | | n/a* |
| | 0 | 0.25 | | 0 | | FIG. 13 |
| 0.1 | 4.5 | 0.5 | 9:1 | 0.925 | 13.3 | FIG. 12 |
| | 4.5 | 0 | | 0 | | n/a* |
| | 0 | 0.5 | | 0 | | FIG. 13 |

*Not applicable since no performance was observed at or below 5 ppm.

RB+EQ-B–5 ppm Blends

Figure 14:
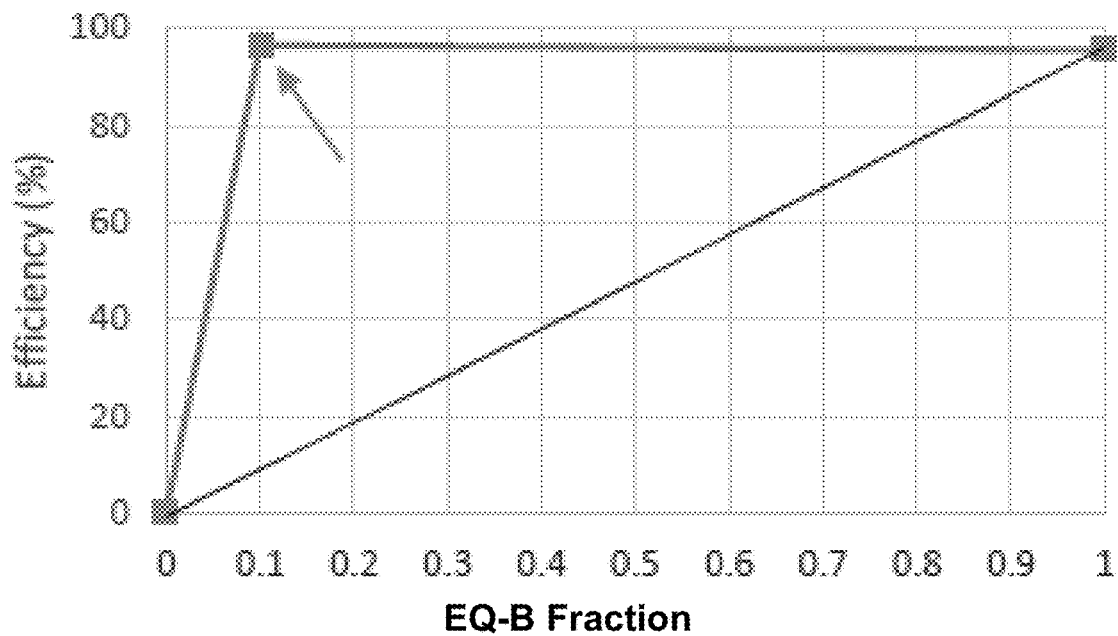
FIG. 14 is a graph of calculated inhibitor efficiency as a function of EQ-B fraction in a blend of RB and EQ-B for a total concentration of 5 ppm demonstrating synergy at the point with an arrow.
Figure 15:
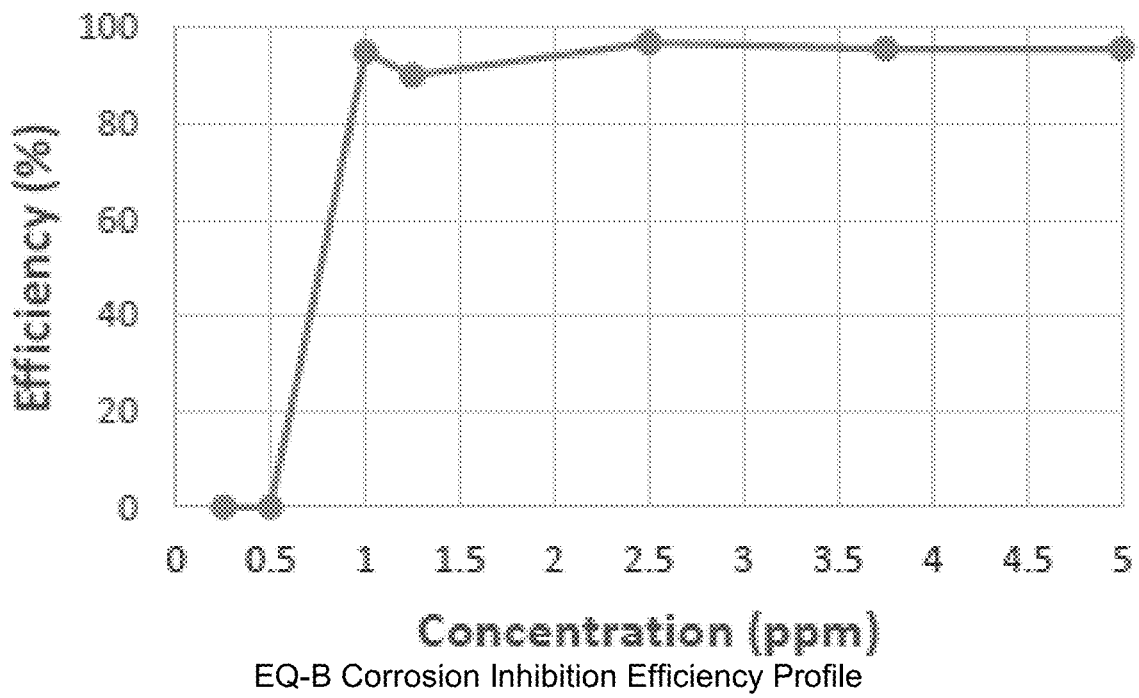
FIG. 15 is a graph of calculated inhibitor efficiency as a function of EQ-B concentration for the FIG. 14 blend.

Table IX shows the synergy factors calculated for the RB and EQ-B blend with the ratio of 9:1. FIG. 14 shows the mixture data points using a plot of the mixture corrosion inhibition efficiency versus the fraction of EQ-B in the mixture. In this case, the synergy factor obtained for the 9:1 ratio was of 30.3 which suggests a very strong synergistic interaction. Neither RB nor EQ-B exhibited performance at the concentrations used in the mixture which makes the case for synergistic interaction much stronger. It was not beneficial to test this combination at other ratios because EQ-B exhibited efficiencies larger than 95% down to 1.25 ppm; therefore, EQ-B performance is dominant at concentrations greater than 1.25 ppm. FIG. 3 shows the corrosion inhibition efficiency profile for RB while FIG. 15 shows the corrosion inhibition profile for EQ-B. RB did not exhibit corrosion inhibition at any concentration up to and including 5 ppm; therefore, no plot is needed to visualize its performance.

TABLE IX

Surface Coverages and Synergy Factors for RB and EQ-B Blends

| Wt. Fraction of EQ-B | RB (ppm) | EQ-B (ppm) | Wt. Ratio | θ | $S_\theta$ | FIG. |
|---|---|---|---|---|---|---|
| | 5 | 0 | | 0 | | n/a* |
| | 0 | 5 | | 95.7 | | FIG. 15 |
| 0.1 | 4.5 | 0.5 | 9:1 | 0.967 | 30.3 | FIG. 14 |
| | 4.5 | 0 | | 0 | | n/a* |
| | 0 | 0.5 | | 0 | | FIG. 15 |

*Not applicable since no performance was observed at or below 5 ppm.

RB+PEQ-A–5 ppm Blends

Figure 16:
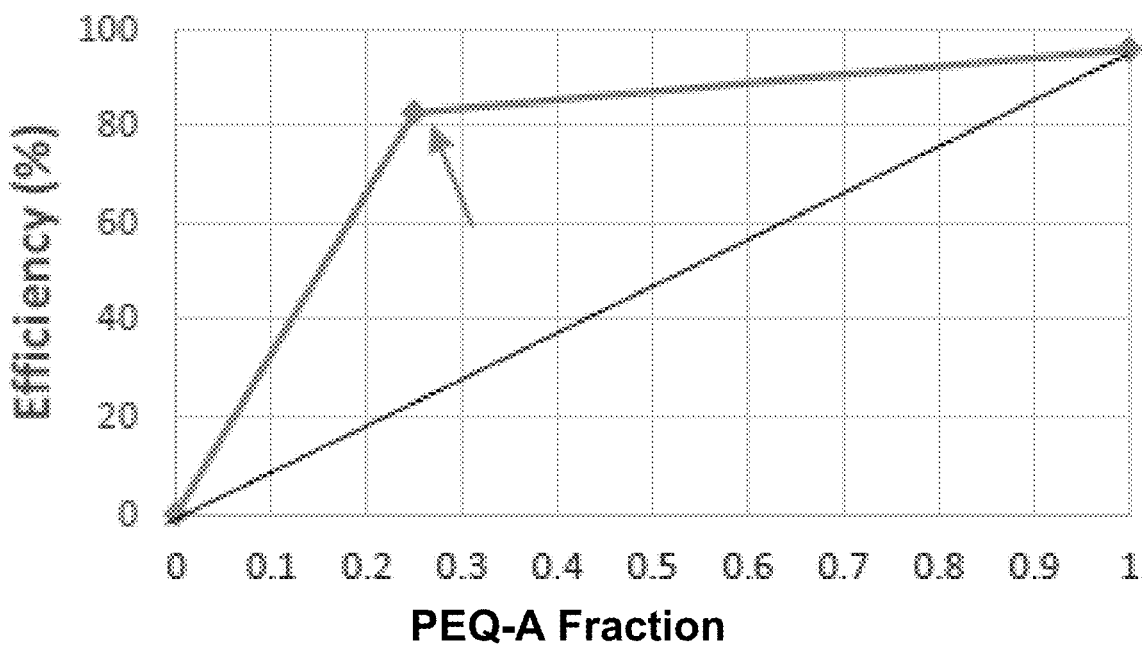
FIG. 16 is a graph of calculated inhibitor efficiency as a function of PEQ-A fraction in a blend of RB and PEQ-A for a total concentration of 5 ppm demonstrating synergy at the point with an arrow.
Figure 17:
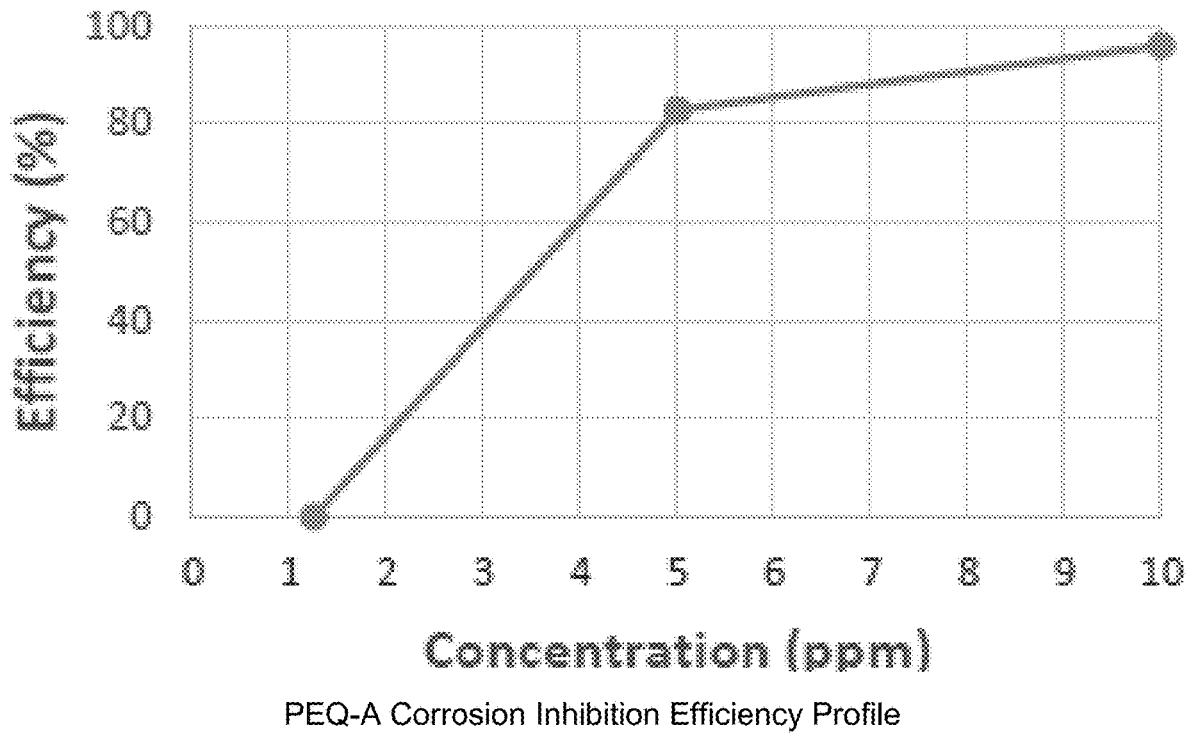
FIG. 17 is a graph of calculated inhibitor efficiency as a function of PEQ-A concentration for the FIG. 16 blend.

Table X shows the synergy factor calculated for the RB and PEQ-A blend with the ratio of 3:1. FIG. 16 shows the mixture data points using a plot of the mixture corrosion inhibition efficiency versus the fraction of PEQ-A in the mixture. In this case, the synergy factor obtained for the 3:1 ratio was of 5.8 which suggests a strong synergistic interaction. Neither RB nor PEQ-A exhibited performance at the concentrations used in the tested mixtures which makes the case for synergistic interaction stronger. FIG. 17 shows the corrosion inhibition profile for PEQ-A. RB did not exhibit corrosion inhibition at any concentration up to and including 5 ppm; therefore, no plot is needed to visualize its performance.

TABLE X

Surface Coverages and Synergy Factors for RB and PEQ-A Blends

| Wt. Fraction of PEQ-A | RB (ppm) | PEQ-A (ppm) | Wt. Ratio | θ | $S_\theta$ | FIG. |
|---|---|---|---|---|---|---|
| | 5 | 0 | | 0 | | n/a* |
| | 0 | 5 | | 0.828 | | FIG. 17 |
| 0.25 | 3.75 | 1.25 | 3:1 | 0.827 | 5.8 | FIG. 16 |
| | 3.75 | 0 | | 0 | | n/a* |
| | 0 | 1.25 | | 0 | | FIG. 17 |

*Not applicable since no performance was observed at or below 5 ppm.

RB+PEQ-B–5 ppm Blends

Figure 18:
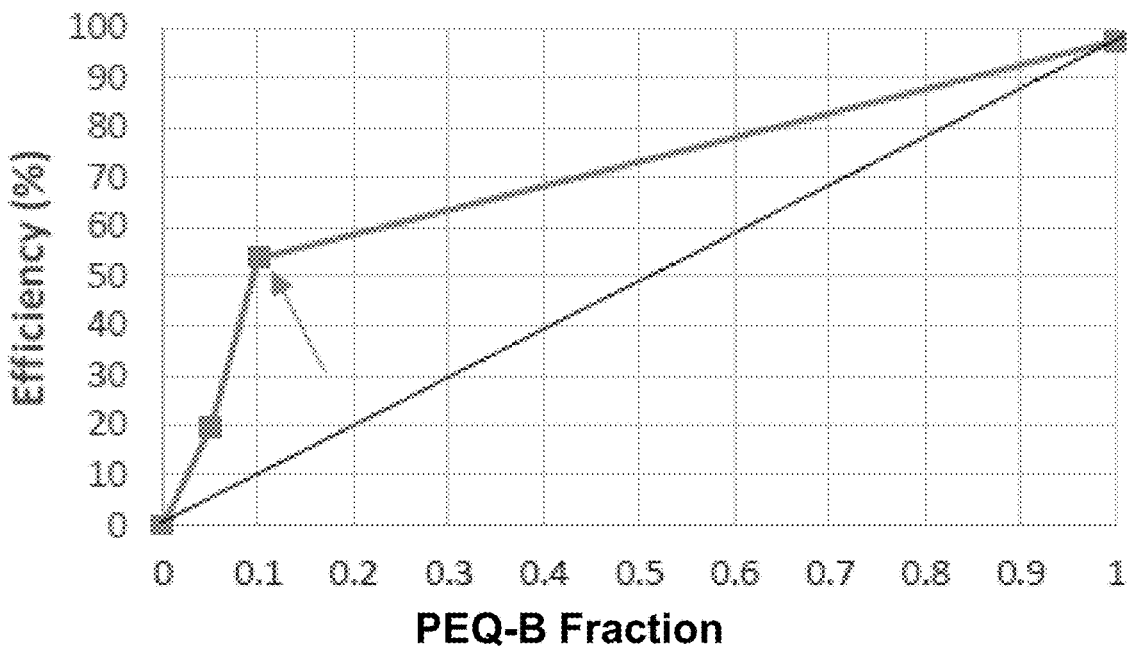
FIG. 18 is a graph of calculated inhibitor efficiency as a function of PEQ-B fraction in a blend of RB and PEQ-B for a total concentration of 5 ppm demonstrating synergy at the point with an arrow.
Figure 19:
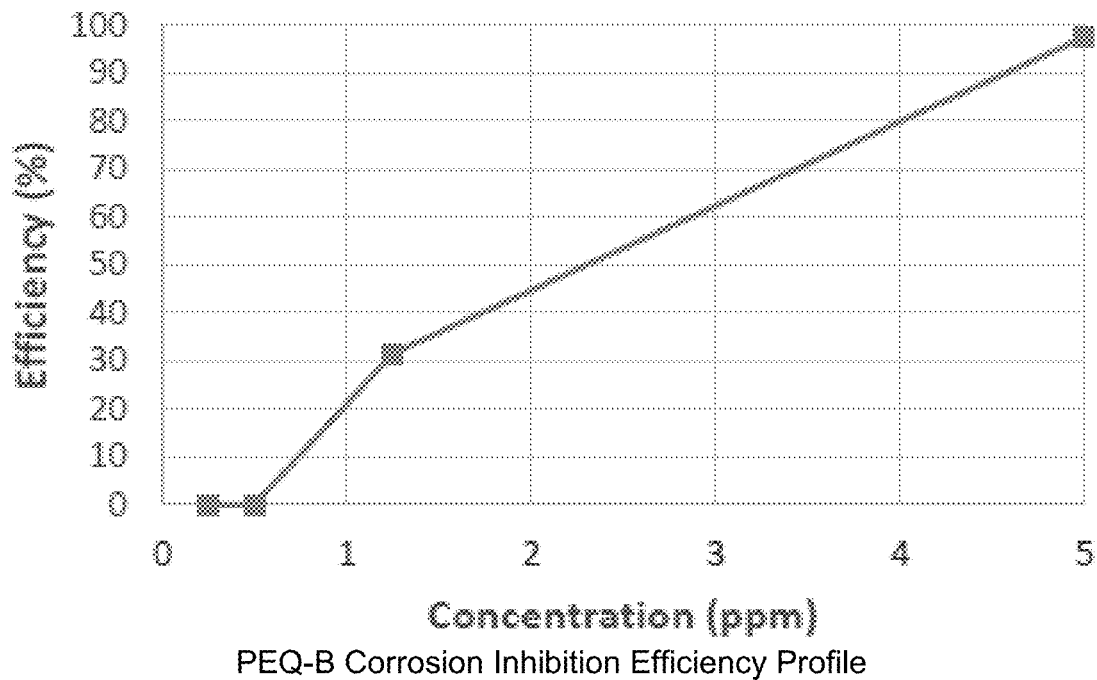
FIG. 19 is a graph of calculated inhibitor efficiency as a function of PEQ-B concentration for the FIG. 18 blend.

Table XI shows the synergy factor calculated for the RB and PEQ-B blends with the ratios of 19:1 and 9:1. FIG. 18 shows the mixture data points using a plot of the mixture corrosion inhibition efficiency versus the fraction of PEQ-B in the mixture. In this case, the synergy factor obtained for the 19:1 and 9:1 ratios were of 1.2 and 2.2 which suggest a synergistic interaction. Neither RB nor PEQ-B exhibited performance at the concentrations used in the mixtures which makes the case for synergistic interaction stronger. FIG. 19 shows the corrosion inhibition profile for PEQ-B. There is the possibility that RB would be synergistic with PEQ-B at the ratio of 3:1 considering that at 1.25 ppm PEQ-B exhibited some efficiency (30%) at this dosage which might be boosted by a synergistic interaction. RB did not exhibit corrosion inhibition at any concentration up to an including 5 ppm; therefore, no plot is needed to visualize its performance.

TABLE XI

Surface Coverages and Synergy Factors for RB and PEQ-B Blends

| Wt. Fraction of PEQ-B | RB (ppm) | PEQ-B (ppm) | Wt. Ratio | θ | $S_\theta$ | FIG. |
|---|---|---|---|---|---|---|
| | 5 | 0 | | 0 | | n/a* |
| | 0 | 5 | | 0.975 | | FIG. 19 |
| 0.05 | 4.75 | 0.25 | 19:1 | 0.195 | 1.2 | FIG. 18 |
| | 4.75 | 0 | | 0 | | n/a* |
| | 0 | 0.25 | | 0 | | FIG. 19 |
| 0.1 | 4.5 | 0.5 | 9:1 | 0.537 | 2.2 | FIG. 18 |
| | 4.5 | 0 | | 0 | | n/a* |
| | 0 | 0.5 | | 0 | | FIG. 19 |

*Not applicable since no performance was observed at or below 5 ppm.

EQ-B+PE-A–5 ppm Blends

Figure 20:
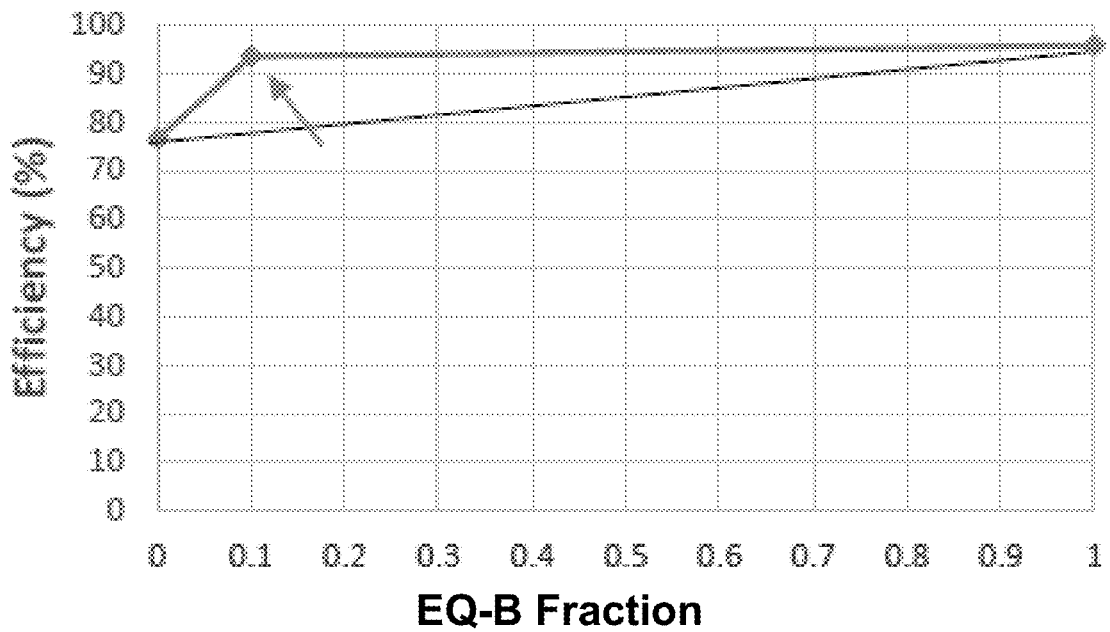
FIG. 20 is a graph of calculated inhibitor efficiency as a function of EQ-B fraction in a blend of PE-A and EQ-B for a total concentration of 5 ppm demonstrating synergy at the point with an arrow.
Figure 21:
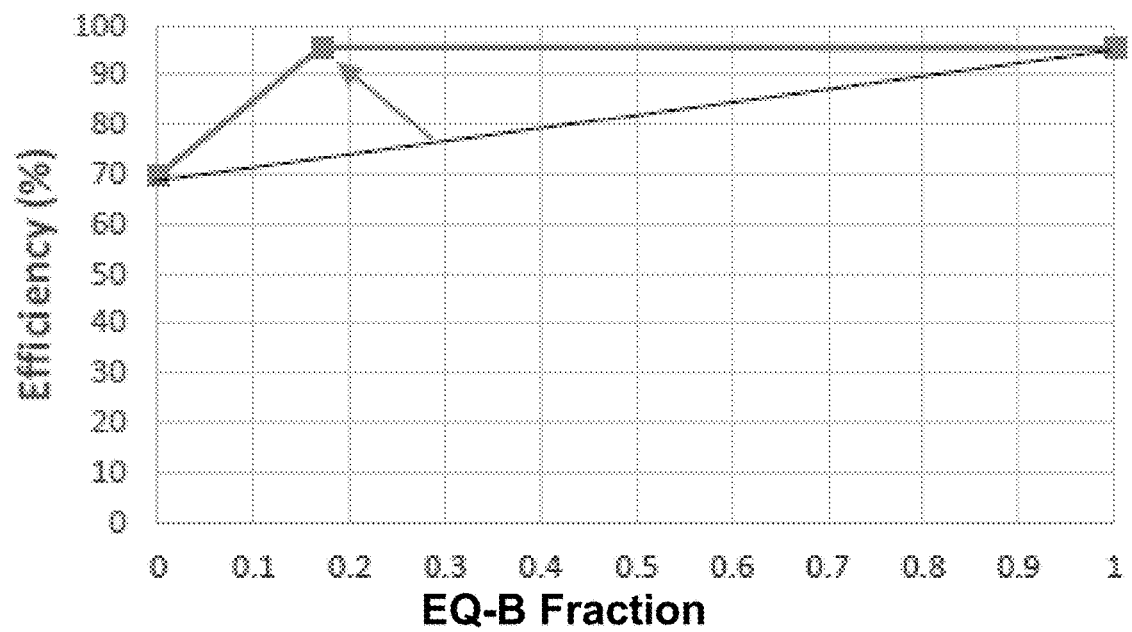
FIG. 21 is a graph of calculated inhibitor efficiency as a function of EQ-B fraction in a blend of PE-A and EQ-B for a total concentration of 3 ppm demonstrating synergy at the point with an arrow.
Figure 22:
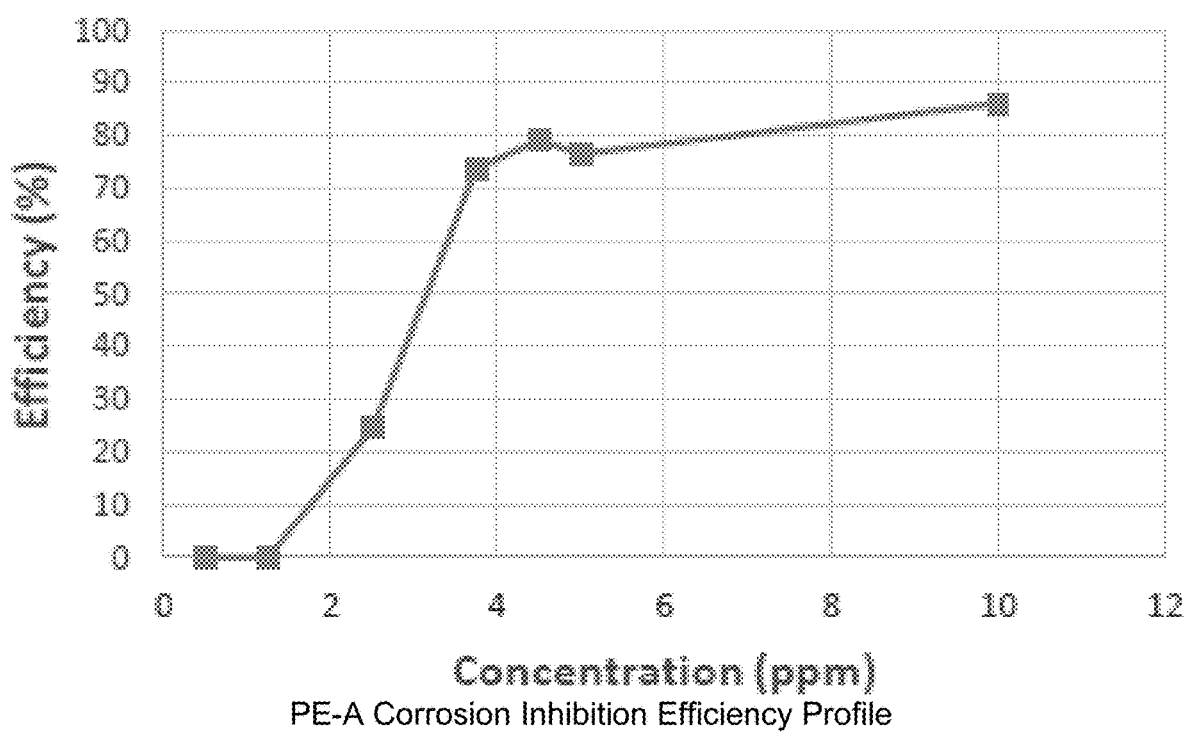
FIG. 22 is a graph of calculated inhibitor efficiency as a function of PE-A concentration for the FIG. 20 blend for the FIG. 20 blend.
Figure 23:
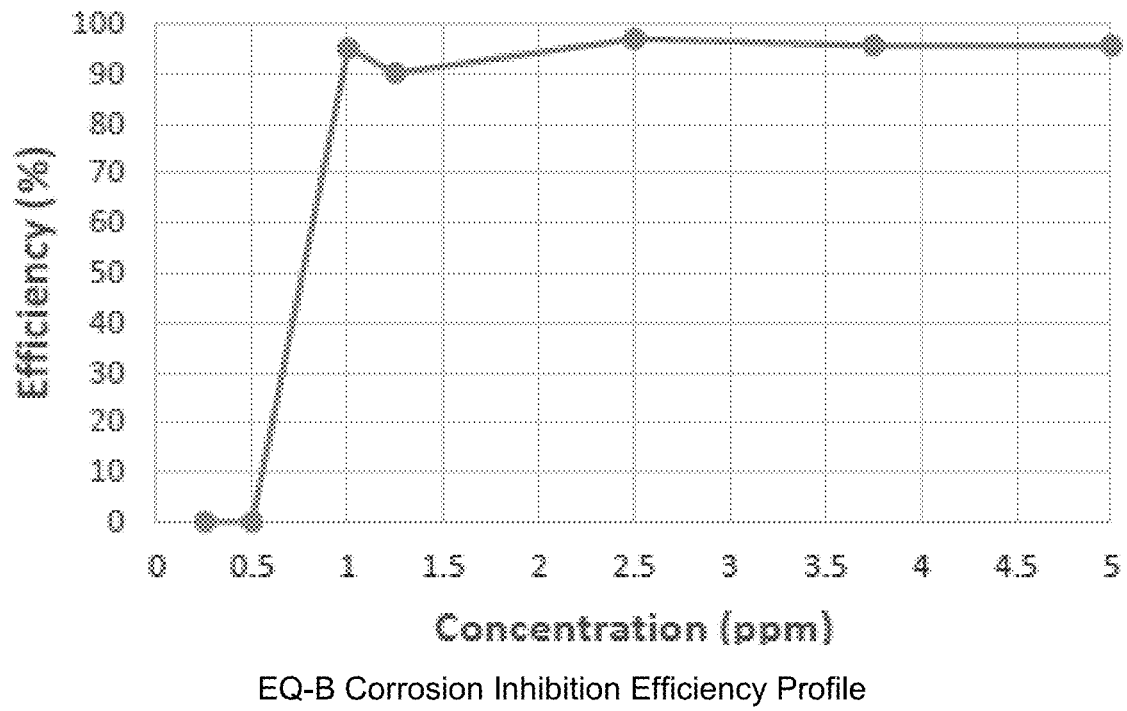
FIG. 23 is a graph of calculated inhibitor efficiency as a function of EQ-B concentration for the FIG. 20 blend.

Table XII shows the synergy factors calculated for the PE-A and EQ-B blends with the ratios of 9:1 and 5:1. FIG. 20 (5 ppm) and FIG. 21 (3 ppm) show the mixture data points using a plot of the mixture corrosion inhibition efficiency versus the fraction of EQ-B in the mixture. The largest synergy factor of 17.6 was obtained for the 5:1 ratio which indicates a very strong synergy between PE-A and EQ-B in the 3 ppm mixture. The synergy factor of 3.2 obtained for the 9:1 ratio also indicates a strong synergy. For both ratios the concentration of EQ-B in the mixture was 0.5 ppm which makes the synergy case stronger considering the EQ-B did not exhibit performance at this concentration by when tested alone. FIG. 22 shows the corrosion inhibition efficiency profile for PE-A while FIG. 23 shows the corrosion inhibition profile for EQ-B.

TABLE XII

Surface Coverages and Synergy Factors for EQ-B and PE-A Blends

| Wt. Fraction of EQ-B | PE-A (ppm) | EQ-B (ppm) | Wt. Ratio | θ | $S_\theta$ | FIG. |
|---|---|---|---|---|---|---|
| | 5 | 0 | | 0.765 | | FIG. 22 |
| | 0 | 5 | | 0.957 | | FIG. 23 |
| 0.1 | 4.5 | 0.5 | 9:1 | 0.934 | 3.2 | FIG. 20 |
| | 4.5 | 0 | | 0.791 | | FIG. 22 |
| | 0 | 0.5 | | 0 | | FIG. 23 |
| | 3 | 0 | | 0.699 | | FIG. 22 |
| | 0 | 3 | | 0.956 | | FIG. 23 |
| 0.17 | 2.5 | 0.5 | 5:1 | 0.957 | 17.6 | FIG. 21 |
| | 2.5 | 0 | | 0.244 | | FIG. 22 |
| | 0 | 0.5 | | 0 | | FIG. 23 |

EQ-B+PE-B–5 ppm Blends

Figure 24:
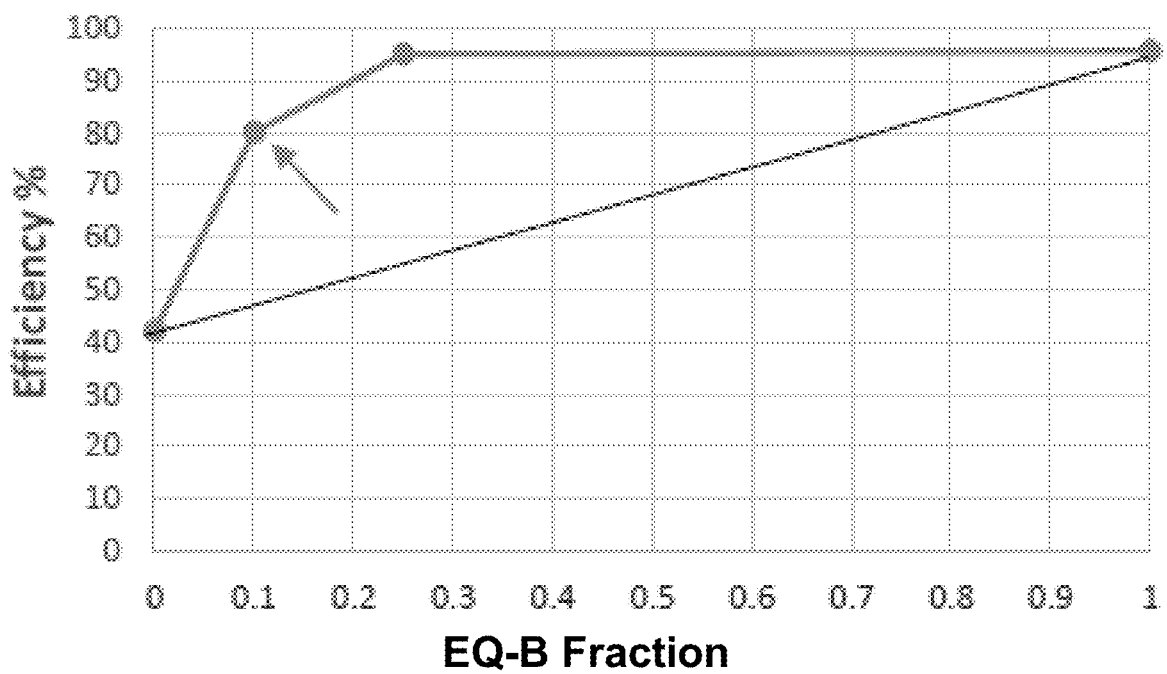
FIG. 24 is a graph of calculated inhibitor efficiency as a function of EQ-B fraction in a blend of PE-B and EQ-B for a total concentration of 5 ppm demonstrating synergy at the point with an arrow.
Figure 25:
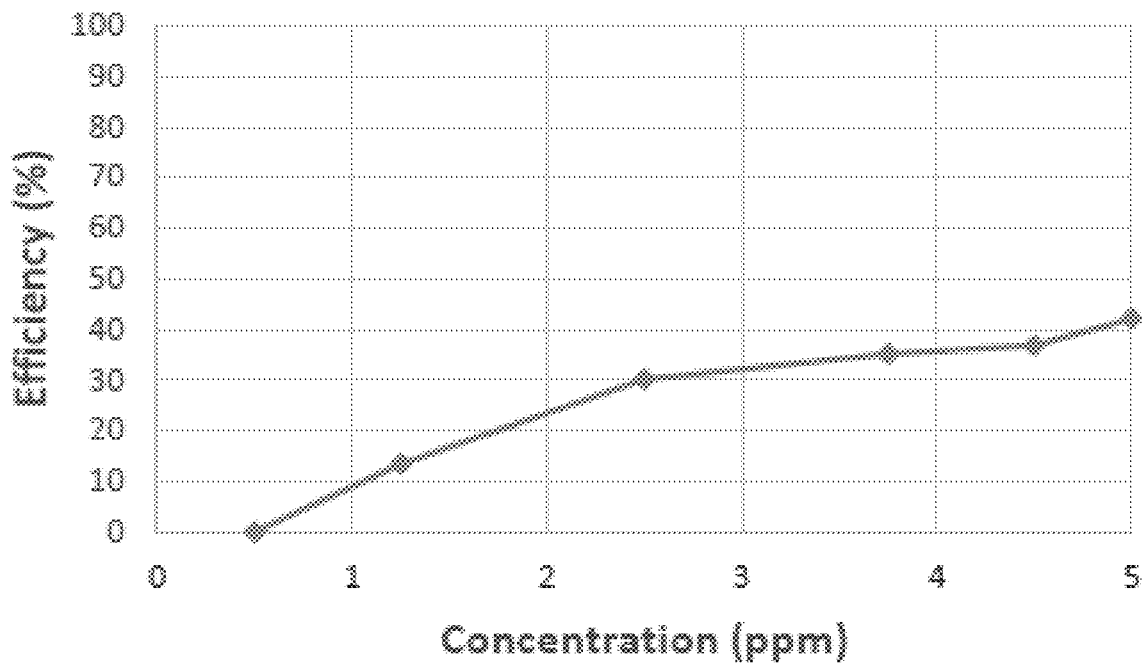
FIG. 25 is a graph of calculated inhibitor efficiency as a function of PE-B concentration for the FIG. 24 blend.

Table XIII shows the synergy factor calculated for the PE-B and EQ-B blends with ratio 9:1 and 3:1. FIG. 24 shows the mixture data points using a plot of the mixture corrosion inhibition efficiency versus the fraction of EQ-B in the mixture. The synergy factor of 3.1 obtained for ratio 9:1 indicates a strong synergy between PE-B and EQ-B. EQ-B did not exhibit corrosion inhibition performance at the concentration used in the mixture by itself which makes the synergy case quite strong. On the other hand, the synergy factor for the 3:1 ratio was of 0.3 which indicates that at this ratio the interaction of EQ-B with PE-B is antagonistic. The efficiency of EQ-B at 1.25 ppm by itself is 90.2%. FIG. 25 shows the corrosion inhibition efficiency profile for PE-B.

TABLE XIII

Surface Coverages and Synergy Factors for EQ-B and PE-B Blends

| Wt. Fraction of EQ-B | EQ-B (ppm) | PE-B (ppm) | Wt. Ratio | θ | $S_\theta$ | FIG. |
|---|---|---|---|---|---|---|
|  | 5 | 0 |  | 0.957 |  | FIG. 23 |
|  | 0 | 5 |  | 0.421 |  | FIG. 25 |
| 0.1 | 0.5 | 4.5 | 1:9 | 0.802 | 3.2 | FIG. 24 |
|  | 0.5 | 0 |  | 0 |  | FIG. 23 |
|  | 0 | 4.5 |  | 0 |  | FIG. 25 |
| 0.25 | 1.25 | 3.75 | 1:3 | 0.802 | 0.32 | FIG. 24 |
|  | 1.25 | 0 |  | 0.902 |  | FIG. 23 |
|  | 0 | 3.75 |  | 0.352 |  | FIG. 25 |

EQ-B+LGC–10.5 ppm Blends

Figure 26:
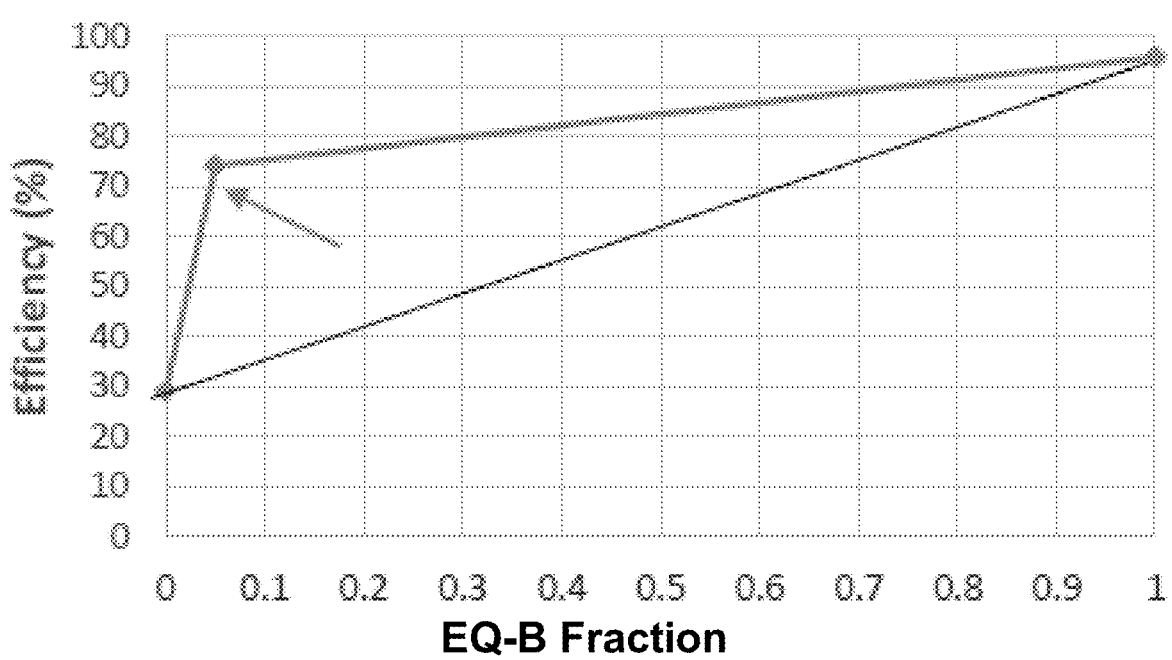
FIG. 26 is a graph of calculated inhibitor efficiency as a function of EQ-B fraction in a blend of LGC and EQ-B for a total concentration of 10.5 ppm demonstrating synergy at the point with an arrow.
Figure 27:
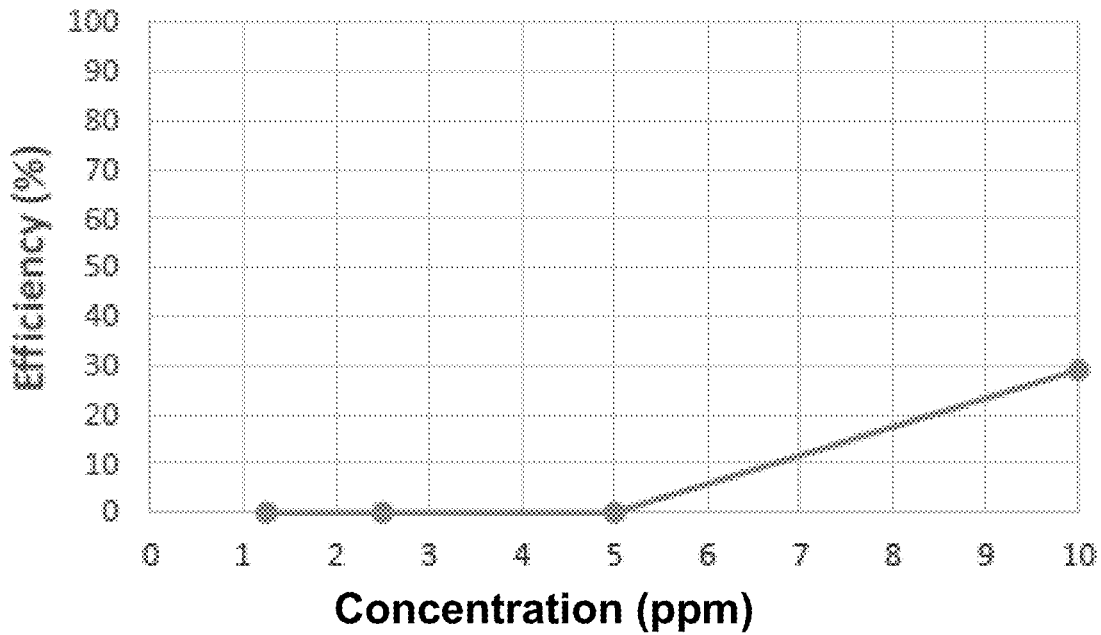
FIG. 27 is a graph of calculated inhibitor efficiency as a function of LGC concentration for the FIG. 26 blend.

Table XIV shows the synergy factor calculated for the LGC and EQ-B blend with ratio 20:1. FIG. 26 shows the mixture data points using a plot of the mixture corrosion inhibition efficiency versus the fraction of EQ-B in the mixture. The synergy factor of 2.7 obtained for the 20:1 mixture suggests significant synergy. LGC was tested at 10 ppm because this was the last concentration at which it exhibited some performance (29.1% efficiency). FIG. 27 shows the corrosion inhibition profile for LGC.

TABLE XIV

Surface Coverages and Synergy Factors for EQ-B and LGC Blends

| Wt. Fraction of EQ-B | LGC (ppm) | EQ-B (ppm) | Wt. Ratio | θ | $S_\theta$ | FIG. |
|---|---|---|---|---|---|---|
|  | 5 | 0 |  | 0 |  | FIG. 27 |
|  | 0 | 5 |  | 0.957 |  | FIG. 23 |
| 0.05 | 10 | 0.5 | 20:1 | 0.741 | 2.7 | FIG. 26 |
|  | 10 | 0 |  | 0.291 |  | FIG. 27 |
|  | 0 | 0.5 |  | 0 |  | FIG. 23 |

Note: No data are available for EQ-B with CGHP but synergy is expected because of the similarities between the structures of LGHP and CGHP. This same logic applies for mixtures of EQ-A with LGHP and CGHP.

EQ-B+LGHP–50.5

Figure 28:
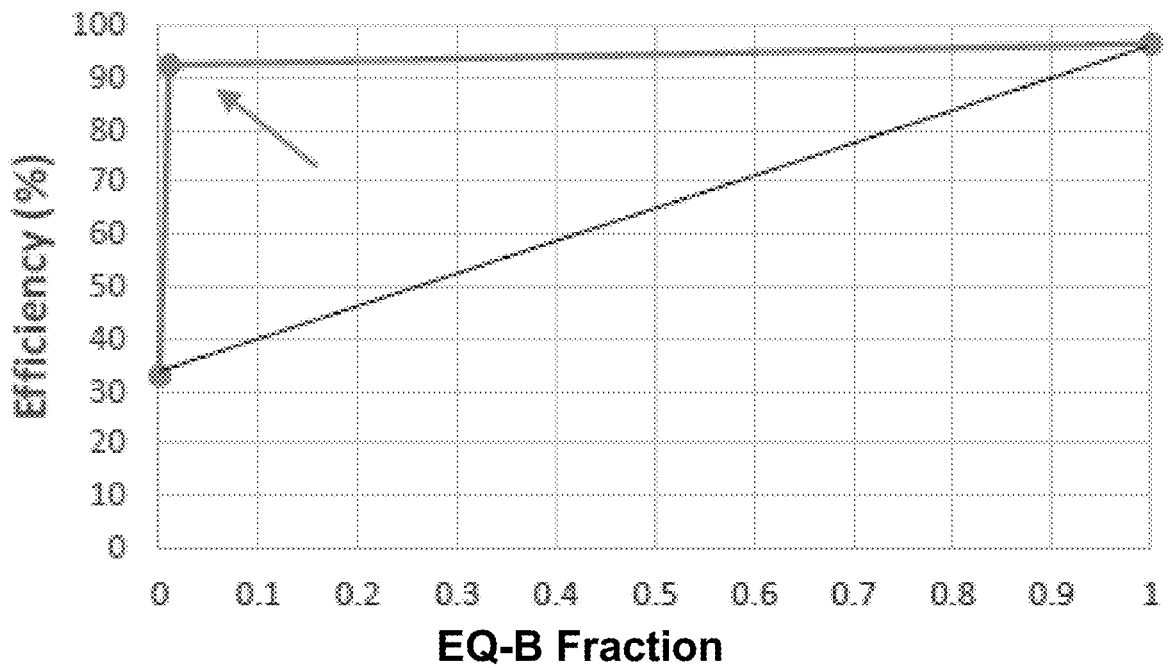
FIG. 28 is a graph of calculated inhibitor efficiency as a function of EQ-B fraction in a blend of LGHP and EQ-B for a total concentration of 50.5 ppm demonstrating synergy at the point with an arrow.
Figure 29:
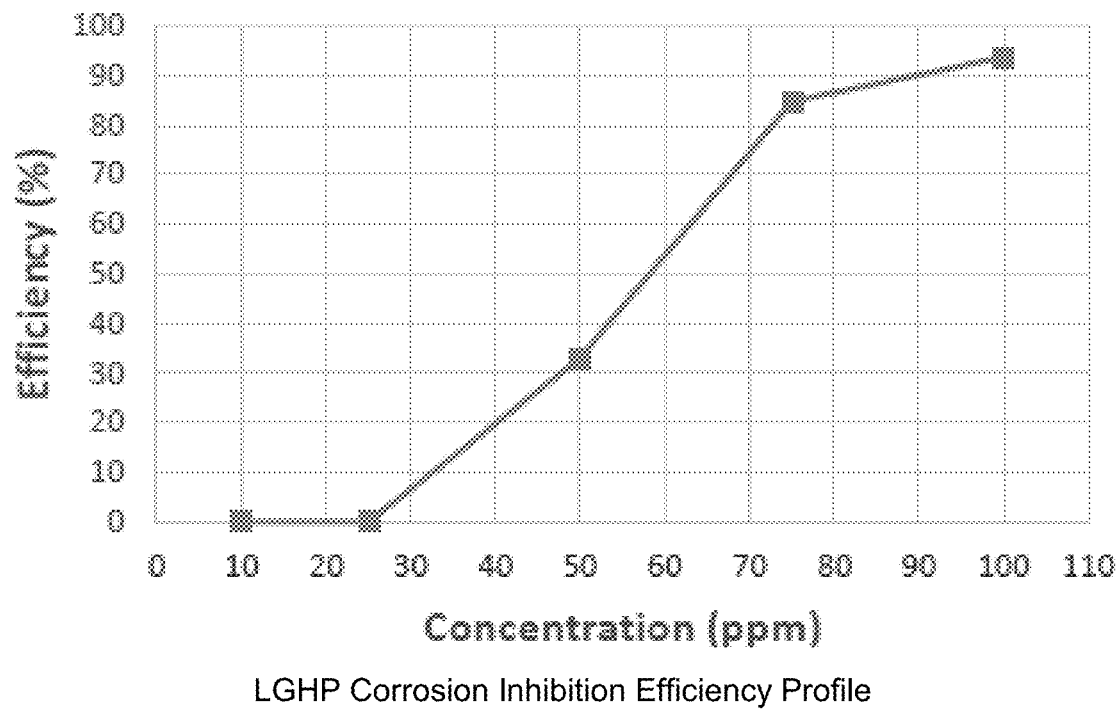
FIG. 29 is a graph of calculated inhibitor efficiency as a function of LGHP concentration.

Table XV shows the synergy factor calculated for the LGHP and EQ-B blend with ratio 100:1. FIG. 28 shows the mixture data points using a plot of the blend corrosion inhibition efficiency versus the fraction of EQ-B in the mixture. The synergy factor of 8.8 obtained for the 100:1 mixture suggests significant synergy. LGHP was tested at 50 ppm because this was the last concentration at which it exhibited some performance (33.0% efficiency). FIG. 29 shows the corrosion inhibition efficiency profile of LGHP.

TABLE XV

Surface Coverages and Synergy Factors for EQ-B and LGHP Blends

| Wt. Fraction of EQ-B | LGHP (ppm) | EQ-B (ppm) | Wt. Ratio | θ | $S_\theta$ | FIG. |
|---|---|---|---|---|---|---|
|  | 50 | 0 |  | 0.33 |  | FIG. 29 |
| 0.01 | 50 | 0.5 | 100:1 | 0.924 | 8.8 | FIG. 28 |
|  | 0 | 0.5 |  | 0 |  | FIG. 23 |

SB+LGC–5 ppm Blends

Figure 30:
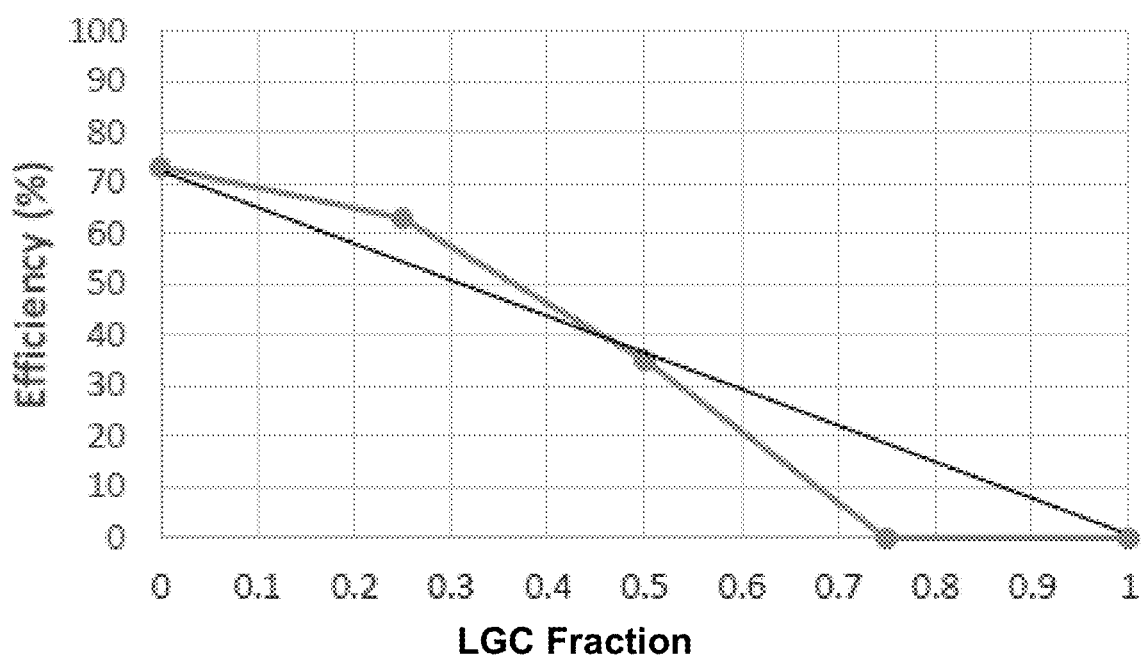
FIG. 30 is a graph of calculated inhibitor efficiency as a function of LGC fraction in a blend of SB and LGC for a total concentration of 5 ppm.
Figure 31:
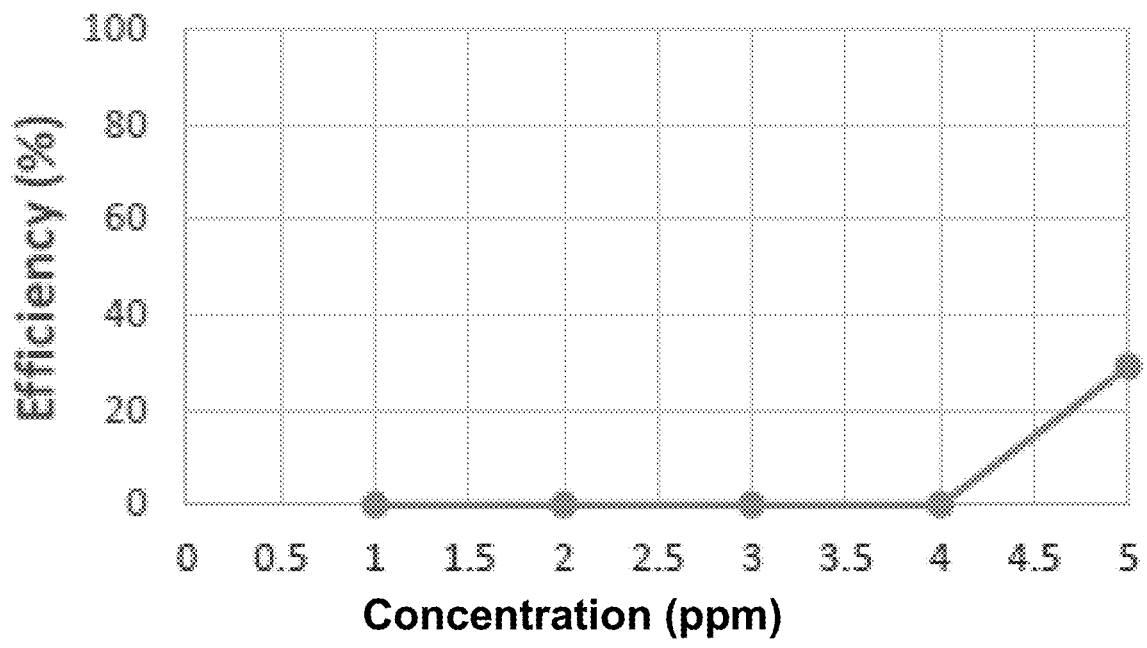
FIG. 31 is a graph of calculated inhibitor efficiency as a function of LGC concentration for the FIG. 30 blend.

Table XVI shows the synergy factors calculated for the SB and LGC blends with ratios of 3:1 and 1:1. FIG. 30 shows the mixture data points using a plot of the mixture corrosion inhibition efficiency versus the fraction of LGC in the mixture. In this case, the tested ratios 3:1 and 1:1 exhibited synergy factors of 1.3 and 0.9, respectively. These synergy factors do not suggest a strong synergy but they do not suggest an antagonistic interaction either. FIG. 3 shows the corrosion inhibition efficiency profile for SB while FIG. 31 shows the corrosion inhibition profile for LGC. The LGC did not exhibit corrosion inhibition performance at or below 5 ppm.

TABLE XVI

Surface Coverages and Synergy Factors for SB and LGC Blends

| Wt. Fraction of LGC | SB (ppm) | LGC (ppm) | Wt. Ratio | θ | $S_\theta$ | FIG. |
|---|---|---|---|---|---|---|
|  | 5 | 0 |  | 0.732 |  | FIG. 3 |
|  | 0 | 5 |  | 0 |  | FIG. 31 |
| 0.25 | 3.75 | 1.25 | 3:1 | 0.631 | 1.3 | FIG. 30 |
|  | 3.75 | 0 |  | 0.505 |  | FIG. 3 |
|  | 0 | 1.25 |  | 0 |  | FIG. 31 |
| 0.5 | 2.5 | 2.5 | 1:1 | 0.351 | 0.9 | FIG. 30 |
|  | 2.5 | 0 |  | 0.408 |  | FIG. 3 |
|  | 0 | 2.5 |  | 0 |  | FIG. 31 |

SB+LGHP–50 ppm Blends

Figure 32:
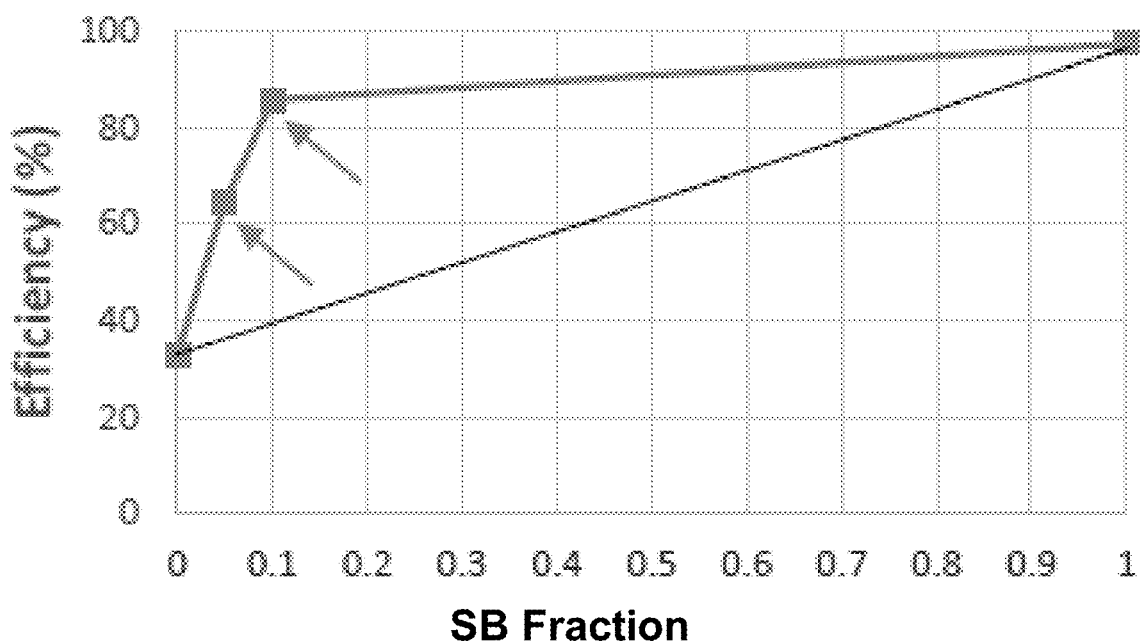
FIG. 32 is a graph of calculated inhibitor efficiency as a function of LGHP fraction in a blend of SB and LGHP for a total concentration of 50 ppm demonstrating synergy at the points with arrows.
Figure 33:
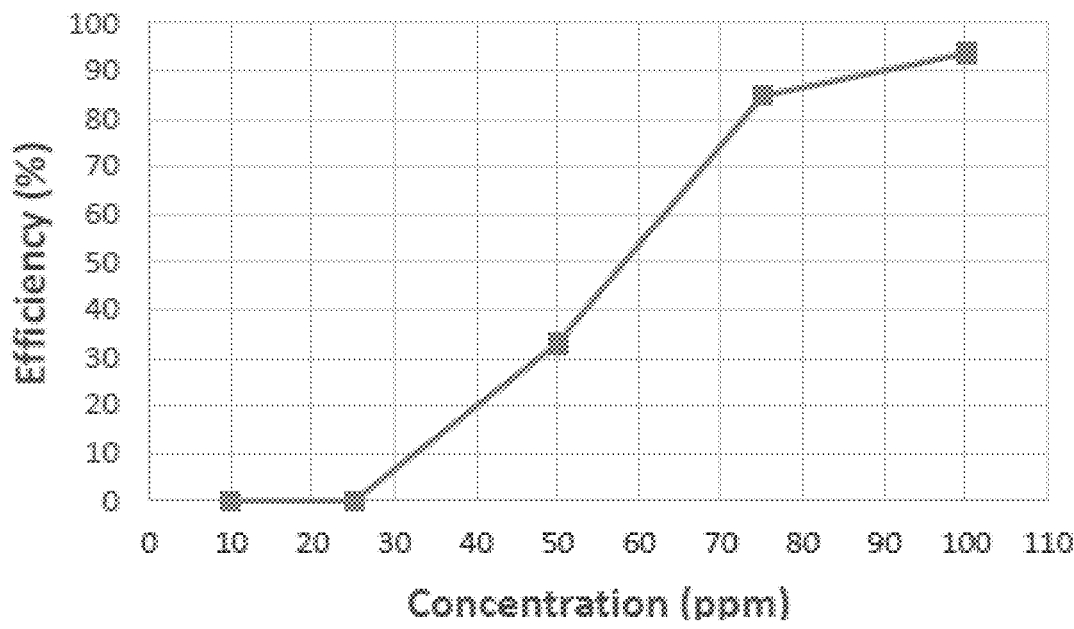
FIG. 33 is a graph of calculated inhibitor efficiency as a function of LGHP concentration for the FIG. 32 blend.

Table XVII shows the synergy factors calculated for the SB and LGHP blends with ratios of 20:1 and 10:1. FIG. 32 shows the mixture data points using a plot of the mixture corrosion inhibition efficiency versus the fraction of LGHP in the mixture. In this case, the tested ratios exhibited synergy factors of 1.3 for both ratios. These synergy factors do not suggest a strong synergy between SB and LGHP but they also do not suggest an antagonistic interaction. FIG. 3 shows the corrosion inhibition efficiency profile for SB while FIG. 33 shows the corrosion inhibition profile for LGHP. The LGHP did not exhibit corrosion inhibition performance at or below 25 ppm.

TABLE XVII

Surface Coverages and Synergy Factors for SB and LGHP Blends

| Wt. Fraction of SB | LGHP (ppm) | SB (ppm) | Wt. Ratio | θ | $S_\theta$ | FIG. |
|---|---|---|---|---|---|---|
|  | 50 | 0 |  | 0.33 |  | FIG. 33 |
| 0.05 | 50 | 2.5 | 20:1 | 0.699 | 1.3 | FIG. 32 |
|  | 0 | 2.5 |  | 0.408 |  | FIG. 3 |

TABLE XVII-continued

Surface Coverages and Synergy Factors for SB and LGHP Blends

| Wt. Fraction of SB | LGHP (ppm) | SB (ppm) | Wt. Ratio | θ | $S_θ$ | FIG. |
|---|---|---|---|---|---|---|
| 0.09 | 50 | 5 | 10:1 | 0.857 | 1.3 | FIG. 32 |
|  | 0 | 5 |  | 0.732 |  | FIG. 3 |

SB+PE-A–5 ppm Blends

Figure 34:
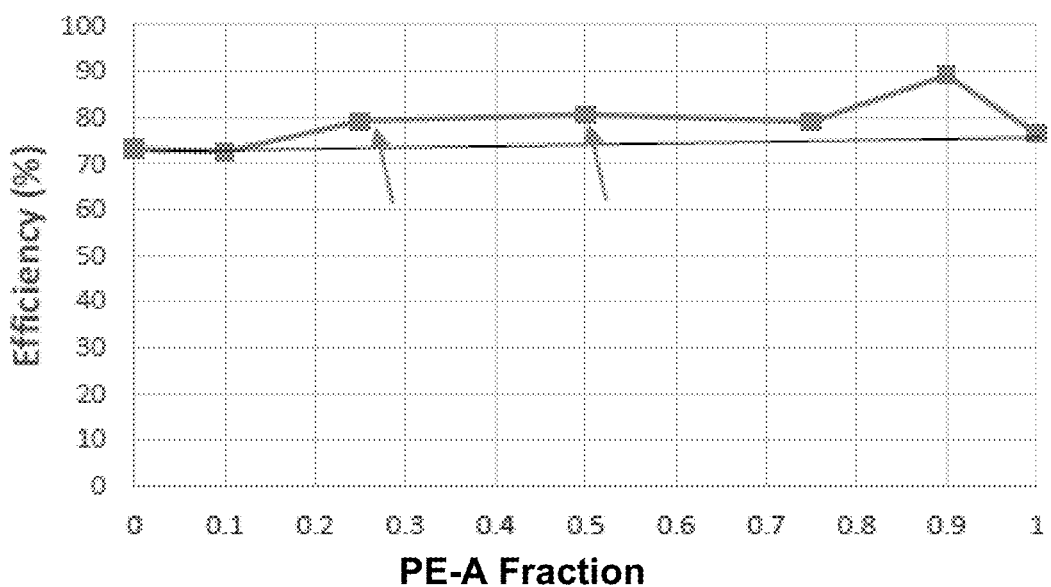
FIG. 34 is a graph of calculated inhibitor efficiency as a function of PE-A fraction in a blend of SB and PE-B for a total concentration of 5 ppm demonstrating synergy at the points with arrows.
Figure 35:
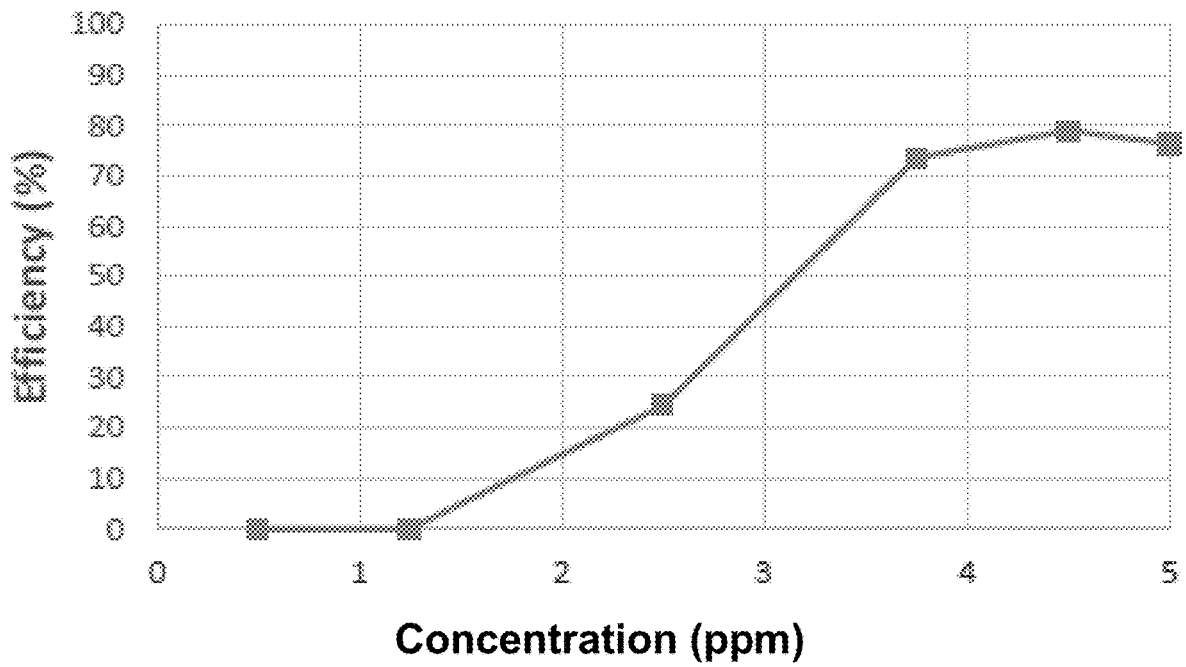
FIG. 35 is a graph of calculated inhibitor efficiency as a function of PE-A concentration for the FIG. 34 blend.

Table XVIII shows the synergy factors calculated for the SB and PE-A blends with ratios of 9:1, 3:1, 1:1, 1:3, and 1:9. FIG. 34 shows the mixture data points using a plot of the mixture corrosion inhibition efficiency versus the fraction of PE-A in the mixture. In this case, the largest synergy factors of 2.4 and 2.3 were obtained for the 3:1 and the 1:1 ratios, respectively, which suggest a synergistic interaction. PE-A did not exhibit corrosion inhibition performance by itself at the concentration used in the 3:1 mixture which makes the case for synergistic interaction stronger. The other calculated synergy factors were lower but do not indicate an antagonistic interaction by being larger than one. FIG. 3 shows the corrosion inhibition efficiency profile for SB while FIG. 35 shows the corrosion inhibition profile for PE-A. The PE-A did not exhibit corrosion inhibition performance at or below 1.25 ppm.

TABLE XVII

Surface Coverages and Synergy Factors for SB and PE-A Blends

| Wt. Fraction of PE-A | SB (ppm) | PE-A (ppm) | Wt. Ratio | θ | $S_θ$ | FIG. |
|---|---|---|---|---|---|---|
|  | 5 | 0 |  | 0.732 |  | FIG. 3 |
|  | 0 | 5 |  | 0.765 |  | FIG. 35 |
| 0.1 | 4.5 | 0.5 | 9:1 | 0.725 | 1.5 | FIG. 34 |
|  | 4.5 | 0 |  | 0.60 |  | FIG. 3 |
|  | 0 | 0.5 |  | 0 |  | FIG. 35 |
| 0.25 | 3.75 | 1.25 | 3:1 | 0.792 | 2.4 | FIG. 34 |
|  | 3.75 | 0 |  | 0.505 |  | FIG. 3 |
|  | 0 | 1.25 |  | 0 |  | FIG. 35 |
| 0.5 | 2.5 | 2.5 | 1:1 | 0.807 | 2.3 | FIG. 34 |
|  | 2.5 | 0 |  | 0.408 |  | FIG. 3 |
|  | 0 | 2.5 |  | 0.244 |  | FIG. 35 |
| 0.75 | 1.25 | 3.75 | 1:3 | 0.79 | 1.3 | FIG. 34 |
|  | 1.25 | 0 |  | 0 |  | FIG. 3 |
|  | 0 | 3.75 |  | 0.737 |  | FIG. 35 |
| 0.9 | 0.5 | 4.5 | 1:9 | 0.891 | 1.9 | FIG. 34 |
|  | 0.5 | 0 |  | 0 |  | FIG. 3 |
|  | 0 | 4.5 |  | 0.791 |  | FIG. 35 |

SB+PE-B–5 ppm Blends

Figure 36:
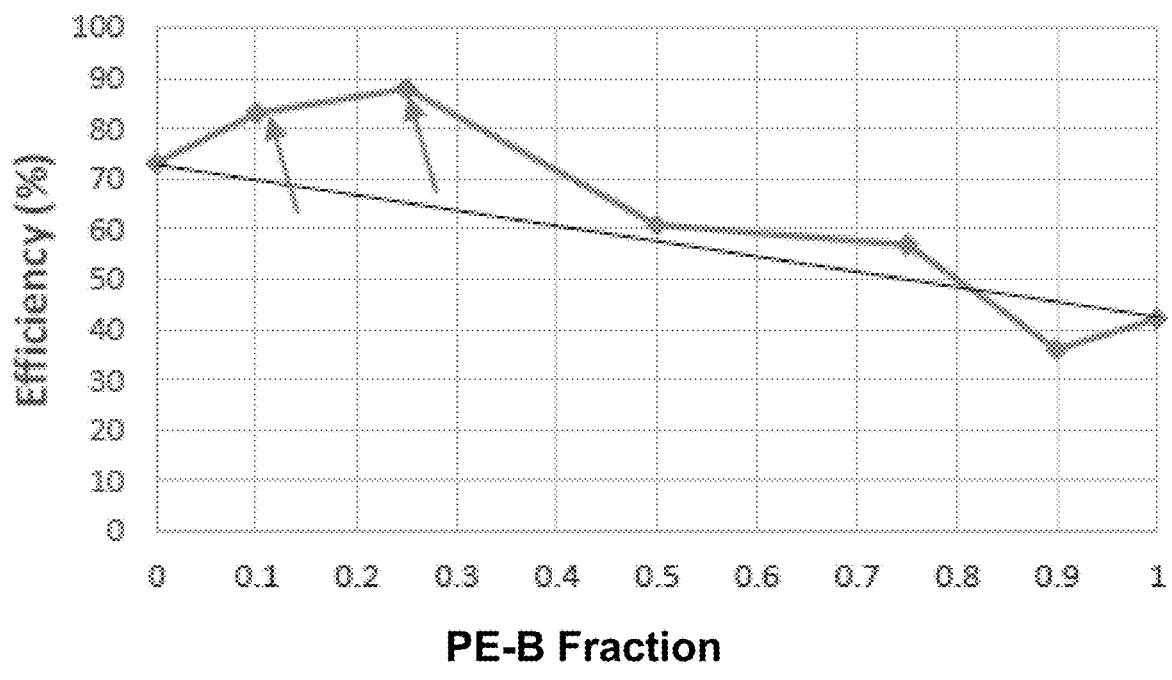
FIG. 36 is a graph of calculated inhibitor efficiency as a function of PE-B fraction in a blend of SB and PE-A for a total concentration of 5 ppm demonstrating synergy at the points with arrows.
Figure 37:
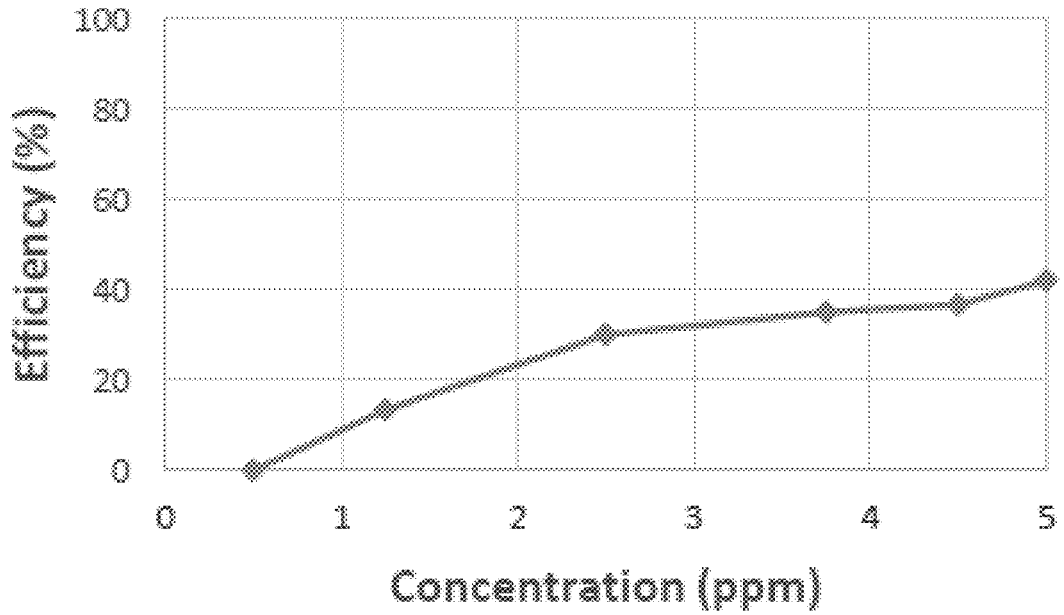
FIG. 37 is a graph of calculated inhibitor efficiency as a function of PE-B concentration for the FIG. 36 blend.

Table XIX shows the synergy factors calculated for the SB and PE-B blends with ratios of 9:1, 3:1, 1:1, 1:3, and 1:9. FIG. 36 shows the mixture data points using a plot of the mixture corrosion inhibition efficiency versus the fraction of PE-B in the mixture. In this case, the largest synergy factors of 2.4 and 3.5 were obtained for the 9:1 and the 3:1 ratios which suggests a synergistic interaction. For ratio 9:1, PE-B did not exhibit performance at 0.5 ppm which makes the case for synergistic interaction stronger. The other calculated synergy factors for ratios 1:1, 1:3, and 1:9 were lower but do not indicate an antagonistic interaction since they are larger than one. FIG. 3 shows the corrosion inhibition efficiency profile for SB while FIG. 37 shows the corrosion inhibition profile for PE-B. PE-B did not exhibit corrosion inhibition performance at or below 0.5 ppm.

TABLE XIX

Surface Coverages and Synergy Factors for SB and PE-B Blends

| Wt. Fraction of PE-B | SB (ppm) | PE-B (ppm) | Wt. Ratio | θ | $S_θ$ | FIG. |
|---|---|---|---|---|---|---|
|  | 5 | 0 |  | 0.732 |  | FIG. 3 |
|  | 0 | 5 |  | 0.421 |  | FIG. 37 |
| 0.1 | 4.5 | 0.5 | 9:1 | 0.83 | 2.4 | FIG. 36 |
|  | 4.5 | 0 |  | 0.60 |  | FIG. 3 |
|  | 0 | 0.5 |  | 0 |  | FIG. 37 |
| 0.25 | 3.75 | 1.25 | 3:1 | 0.879 | 3.5 | FIG. 36 |
|  | 3.75 | 0 |  | 0.505 |  | FIG. 3 |
|  | 0 | 1.25 |  | 0.134 |  | FIG. 37 |
| 0.5 | 2.5 | 2.5 | 1:1 | 0.609 | 1.1 | FIG. 36 |
|  | 2.5 | 0 |  | 0.408 |  | FIG. 3 |
|  | 0 | 2.5 |  | 0.301 |  | FIG. 37 |
| 0.75 | 1.25 | 3.75 | 1:3 | 0.57 | 1.5 | FIG. 36 |
|  | 1.25 | 0 |  | 0 |  | FIG. 3 |
|  | 0 | 3.75 |  | 0.351 |  | FIG. 37 |
| 0.9 | 0.5 | 4.5 | 1:9 | 0.361 | 0.98 | FIG. 36 |
|  | 0.5 | 0 |  | 0 |  | FIG. 3 |
|  | 0 | 4.5 |  | 0.368 |  | FIG. 37 |

EQ-B+EQI–5 ppm

Figure 38:
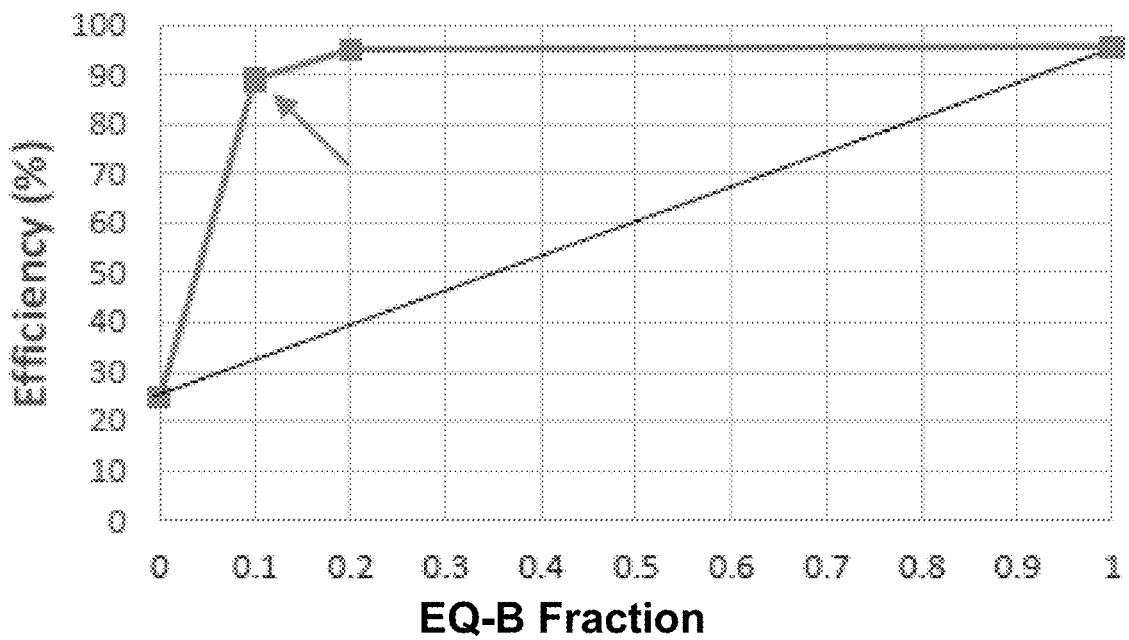
FIG. 38 is a graph of calculated inhibitor efficiency as a function of EQ-B fraction in a blend of EQI and EQ-B for a total concentration of 5 ppm.
Figure 39:
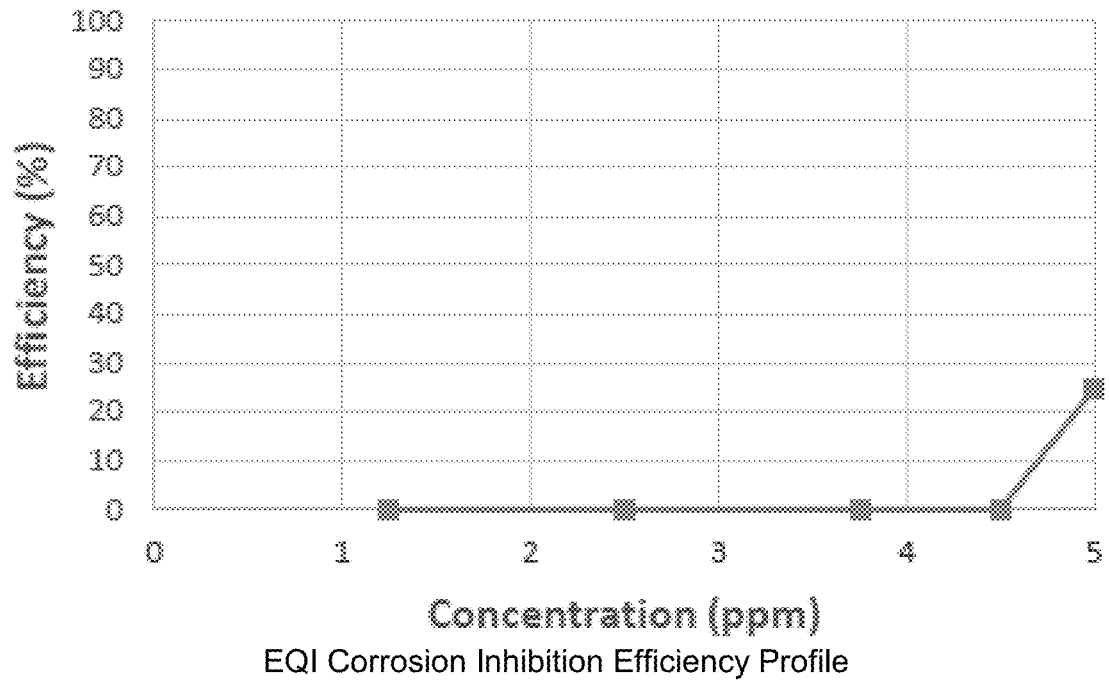
FIG. 39 is a graph of calculated inhibitor efficiency as a function of EQI concentration for the FIG. 38 blend.
Figure 40:
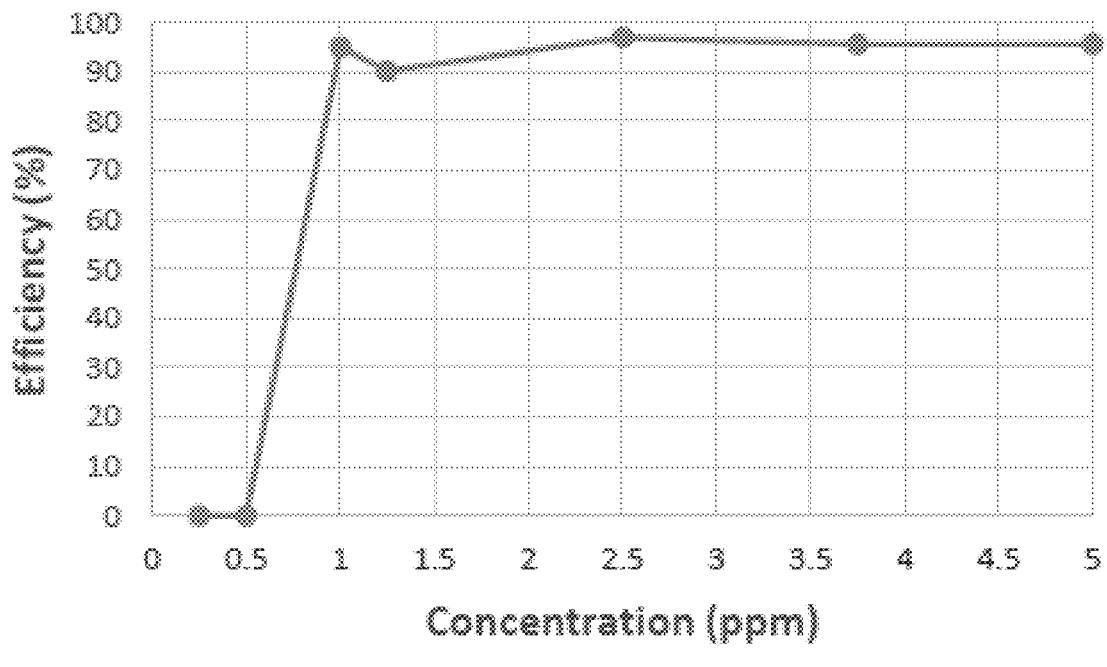
FIG. 40 is a graph of calculated inhibitor efficiency as a function of EQ-B concentration for the FIG. 38 blend.

Table XX shows the synergy factor calculated for the EQI and EQ-B blend with a ratio of 9:1. FIG. 38 shows the mixture data points using a plot of the mixture corrosion inhibition efficiency versus the fraction of EQ-B in the mixture. The synergy factor of 9.1 obtained for ratio 9:1 indicates a very strong synergy between EQI and EQ-B. Both EQI and EQ-B did not exhibit corrosion inhibition performance at the concentrations used in the mixture by themselves which makes the case for synergistic interaction stronger. FIG. 39 shows the corrosion inhibition efficiency profile for EQI while FIG. 40 shows the corrosion inhibition profile for EQ-B.

TABLE XX

Surface Coverages and Synergy Factors for EQI and EQ-B Blends

| Wt. Fraction of EQ-B | EQI (ppm) | EQ-B (ppm) | Wt. Ratio | θ | $S_θ$ | FIG. |
|---|---|---|---|---|---|---|
|  | 5 | 0 |  | 0.248 |  | FIG. 39 |
|  | 0 | 5 |  | 0.957 |  | FIG. 40 |
| 0.1 | 4.5 | 0.5 | 9:1 | 0.89 | 9.1 | FIG. 38 |
|  | 4.5 | 0 |  | 0.60 |  | FIG. 39 |
|  | 0 | 0.5 |  | 0 |  | FIG. 40 |

EQ-B+EI–5 ppm

Figure 41:
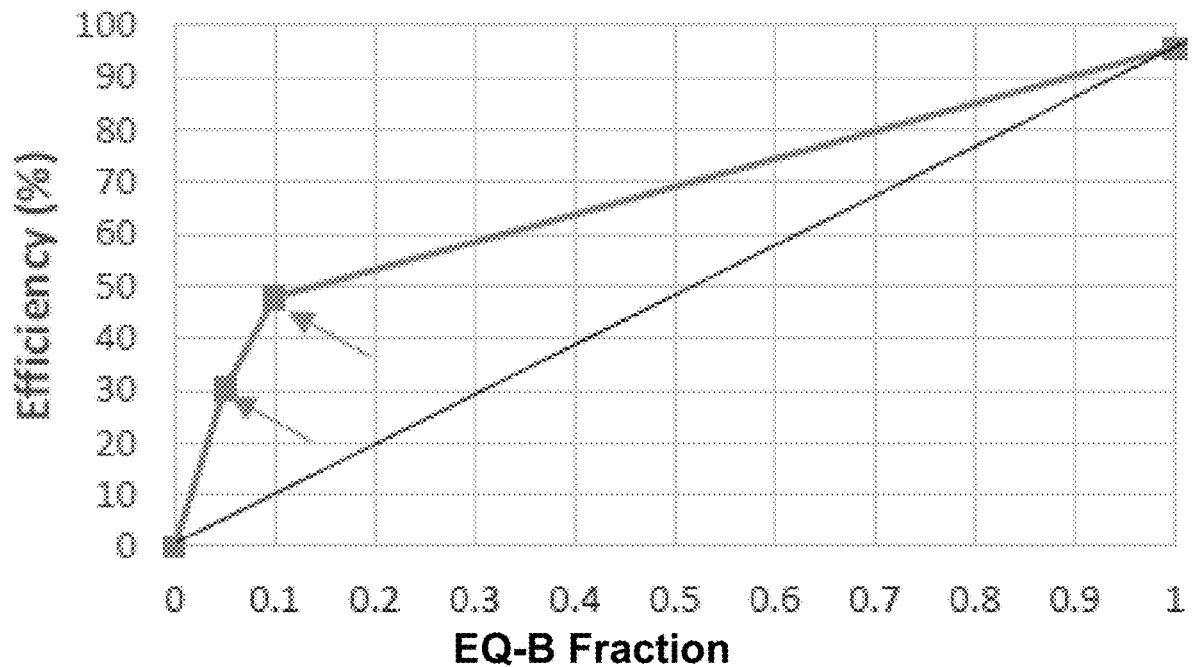
FIG. 41 is a graph of calculated inhibitor efficiency as a function of EQ-B fraction in a blend of EI and EQ-B for a total concentration of 5 ppm demonstrating synergy at the points with arrows.
Figure 42:
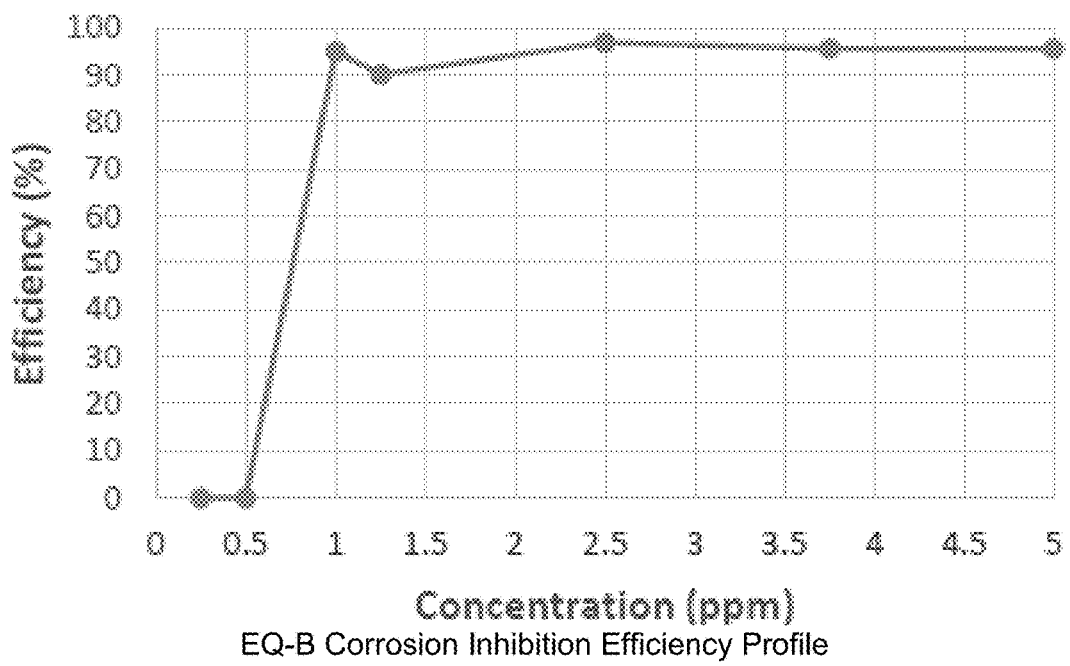
FIG. 42 is a graph of calculated inhibitor efficiency as a function of EQ-B concentration for the FIG. 41 blend.

Table XXI shows the synergy factors calculated for the EI and EQ-B blends with ratios of 19:1 and 9:1. FIG. 41 shows the mixture data points using a plot of the blend corrosion inhibition efficiencies versus the fraction of EQ-B in the mixture. The synergy factors of 1.4 and 1.9 obtained for the 19:1 and 9:1 ratios, respectively, indicate a synergistic interaction between EI and EQ-B. Neither EI nor EQ-B exhibited corrosion inhibition performance at the concentrations used in the blends by themselves which makes the case for synergistic interaction stronger. FIG. 42 shows the corrosion inhibition efficiency profile for EQ-B. EI did not exhibit corrosion inhibition at any concentration up to and including 5 ppm; therefore, no plot is needed to visualize its performance.

TABLE XXI

Surface Coverages and Synergy Factors for EI and EQ-B Blends

| Wt. Fraction of EQ-B | EI (ppm) | EQ-B (ppm) | Wt. Ratio | θ | $S_θ$ | FIG. |
|---|---|---|---|---|---|---|
| | 5 | 0 | | 0 | | n/a* |
| | 0 | 5 | | 0.957 | | FIG. 42 |
| 0.05 | 4.75 | 0.25 | 19:1 | 0.302 | 1.4 | FIG. 41 |
| | 4.75 | 0 | | 0 | | n/a* |
| | 0 | 0.25 | | 0 | | FIG. 42 |
| 0.1 | 4.5 | 0.5 | 9:1 | 0.478 | 1.9 | FIG. 41 |
| | 4.5 | 0 | | 0 | | n/a* |
| | 0 | 0.5 | | 0 | | FIG. 42 |

*Not applicable since no performance was observed at or below 5 ppm.

EQ-A+EI–5 ppm

Figure 43:
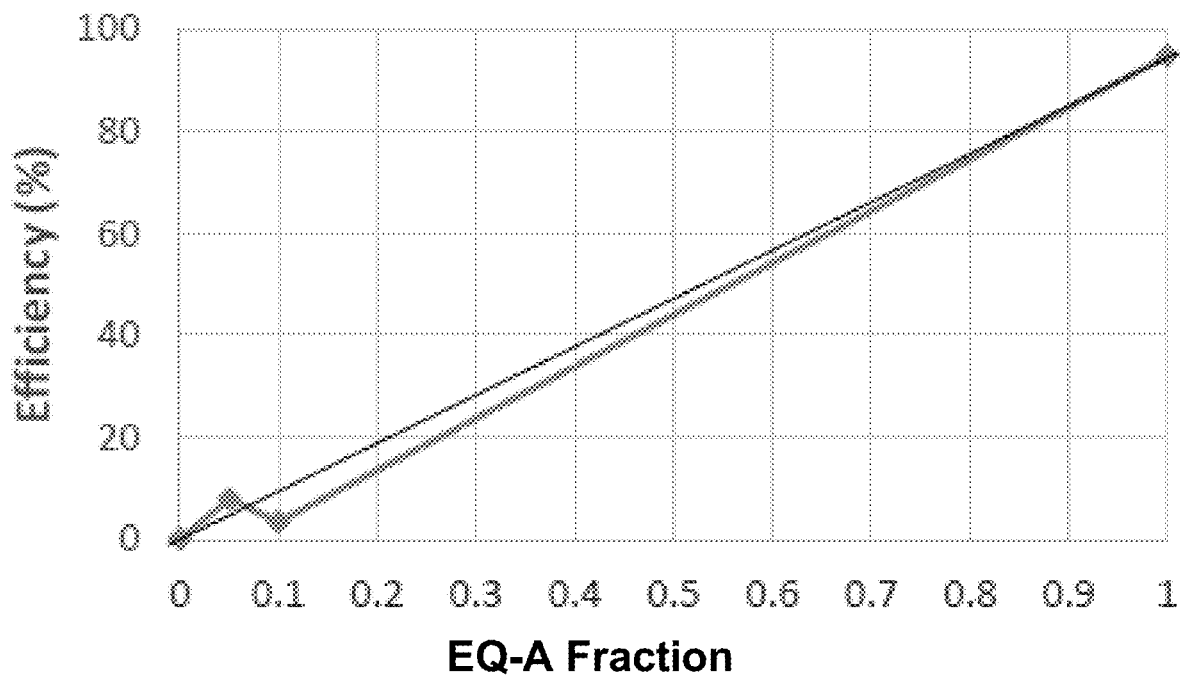
FIG. 43 is a graph of calculated inhibitor efficiency as a function of EQ-A fraction in a blend of EI and EQ-A for a total concentration of 5 ppm.
Figure 44:
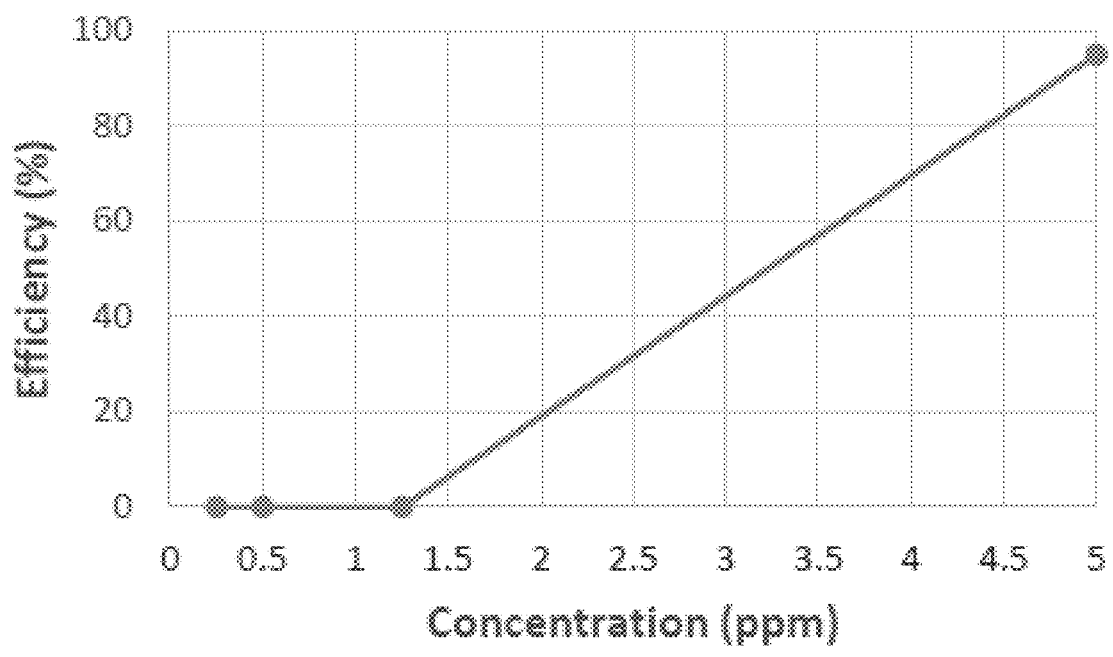
FIG. 44 is a graph of calculated inhibitor efficiency as a function of EQ-A concentration for the FIG. 41 blend.

Table XXI shows the synergy factors calculated for the EI and EQ-A blends with ratios of 19:1 and 9:1. FIG. 43 shows the mixture data points using a plot of the blend corrosion inhibition efficiencies versus the fraction of EQ-A in the mixture. The synergy factors of 1.0 and 1.1 obtained for the 19:1 and 9:1 ratios, respectively, do not indicate a clear synergistic interaction between EI and EQ-A but do not indicate an antagonistic interaction either. FIG. 44 shows the corrosion inhibition efficiency profile for EQ-A. EI did not exhibit corrosion inhibition at any concentration up to and including 5 ppm; therefore, no plot is needed to visualize its performance.

TABLE XXII

Surface Coverages and Synergy Factors for EI and EQ-A Blends

| Wt. Fraction of EQ-A | EI (ppm) | EQ-A (ppm) | Wt. Ratio | θ | $S_θ$ | FIG. |
|---|---|---|---|---|---|---|
| | 5 | 0 | | 0 | | n/a* |
| | 0 | 5 | | 0.948 | | FIG. 44 |
| 0.05 | 4.75 | 0.25 | 19:1 | 0.034 | 1.0 | FIG. 43 |
| | 4.75 | 0 | | 0 | | n/a* |
| | 0 | 0.25 | | 0 | | FIG. 44 |
| 0.1 | 4.5 | 0.5 | 9:1 | 0.079 | 1.1 | FIG. 43 |
| | 4.5 | 0 | | 0 | | n/a* |
| | 0 | 0.5 | | 0 | | FIG. 44 |

*Not applicable since no performance was observed at or below 5 ppm.

Blends of EQ-B with Imidazoline with —$NH_2$ head (INH), Imidazoline/Polyamine (IPA), 1:1 Molar Ratio of Tall Oil Fatty Acid/Diethylenetriamine (TOFA/DETA, or T/D-B), 2:1 Molar Ratio of TOFA/DETA (T/D-A), Poly Imidazolines Note: No data are available for these other Imidazolines. However, these imidazolines are included herein based on the structural similarities between these imidazolines and EQI which showed a strong synergy with EQ-B.

The Examples thus demonstrate how blends of two certain specific components can give unexpectedly synergistic corrosion inhibition improvement of a metal surface in contact with an aqueous fluid.

In the foregoing specification, the invention has been described with reference to specific embodiments thereof, and has been described as effective in providing methods and compositions for directly inhibiting corrosion of a metal surface in contact with an aqueous fluid, in particular one containing corrosive components including, but not necessarily limited to, acid gases such as $H_2S$ and $CO_2$. However, it will be evident that various modifications and changes can be made thereto without departing from the broader scope of the invention. Accordingly, the specification is to be regarded in an illustrative rather than a restrictive sense. For example, specific glycolipids, quaternized amines, phosphate-containing compounds, imidazoline-like compounds, proportions of the compounds in the blends, weight ratios, and other components and procedures falling within the claimed parameters, but not specifically identified or tried in a particular method or composition, are expected to be within the scope of this invention.

The present invention may suitably comprise, consist or consist essentially of the elements disclosed and may be practiced in the absence of an element not disclosed. For instance, there may be provided a method for inhibiting corrosion of a metal surface in contact with an aqueous fluid containing a corrosive component, where the method comprises, consists essentially of, or consists of contacting the metal surface with the aqueous fluid comprising an effective amount to inhibit corrosion of a corrosion-inhibiting blend of two components, where the blend is selected from the group consisting of:
  glycolipids and quaternized amines;
  glycolipids and phosphate-containing compounds;
  quaternized amines and imidazoline-like compounds;
  quaternized amines and phosphate-containing compounds; and
  combinations of these blends;
where each of the two components of the blends are present in an amount effective to synergistically inhibiting the corrosion of the metal surface; and the method further comprises, consists essentially of, or consists of synergistically inhibiting the corrosion of the metal surface with the blend to an extent greater than the sum of the inhibiting of the components achieved singly.

There may also be provided synergistic corrosion-inhibiting binary blends comprising, consisting essentially of, or consisting of:
  glycolipids and quaternized amines;
  glycolipids and phosphate-containing compounds;
  quaternized amines and imidazoline-like compounds;
  quaternized amines and phosphate-containing compounds; and
  combinations of these blends.

The words "comprising" and "comprises" as used throughout, are to be interpreted to mean "including but not limited to" and "includes but not limited to", respectively.

As used herein, the singular forms "a," "an," and "the" are intended to include the plural forms as well, unless the context clearly indicates otherwise.

As used herein, the term "about" in reference to a given parameter is inclusive of the stated value and has the meaning dictated by the context (e.g., it includes the degree of error associated with measurement of the given parameter).

As used herein, the term "and/or" includes any and all combinations of one or more of the associated listed items.

What is claimed is:

1. An oil or gas production fluid comprising:
  a hydrocarbon selected from the group consisting of oil, natural gas, and combinations thereof;
  brine;
  at least one acid gas in equilibrium with the hydrocarbon and the brine where the acid gas is selected from the group consisting of carbon dioxide and hydrogen sulfide; and
  a synergistic corrosion-inhibiting binary blend selected from the group consisting of:
    at least one glycolipid and at least one quaternized amine, wherein the at least one quaternized amine comprises a polyalkylene glycol diester diquat.

2. The oil or gas production fluid of claim 1 where:
  the at least one glycolipid is selected from the group consisting of sophorolipids; and
  the at least one quaternized amine is selected from the group consisting of:
    di(dimethyl(alkyl)ammonium chloride) ethanoyloxy-oxo.

3. The oil or gas production fluid of claim 1 where the blend has a weight ratio of the binary components ranging from about 20:1 to about 1:20.

4. Synergistic corrosion-inhibiting binary blends comprising:
  a blend, wherein the blend is selected from the group consisting of:
    at least one glycolipid and at least one quaternized amine, wherein the at least one quaternized amine comprises a polyalkylene glycol diester diquat.

5. The synergistic corrosion-inhibiting binary blends of claim 4 where:
  the at least one glycolipid is selected from the group consisting of sophorolipids; and
  the at least one quaternized amine is selected from the group consisting of:
    di(dimethyl(alkyl)ammonium chloride) ethanoyloxy-oxo.

6. The synergistic corrosion-inhibiting binary blends of claim 4 where the blend has a weight ratio of components ranging from about 20:1 to about 1:20.

* * * * *